United States Patent [19]

Folsom et al.

[11] Patent Number: 5,630,318
[45] Date of Patent: May 20, 1997

[54] METHOD OF PUMPING WITH A VANE-TYPE PUMP HAVING A FLEXIBLE CAM RING

[75] Inventors: Lawrence R. Folsom; Clive Tucker, both of Pittsfield, Mass.

[73] Assignee: Folsom Technologies, Inc., Pittsfield, Mass.

[21] Appl. No.: 481,802

[22] Filed: Jun. 7, 1995

Related U.S. Application Data

[63] Continuation-in-part of Ser. No. 93,192, filed as PCT/US92/00259, Jan. 14, 1992, Pat. No. 5,423,183, which is a continuation-in-part of Ser. No. 640,645, Jan. 14, 1991, abandoned.

[51] Int. Cl.$^6$ ........................................... F16D 39/00
[52] U.S. Cl. ................................ 60/492; 60/487
[58] Field of Search ......................... 60/487, 490, 491, 60/492

[56] References Cited

U.S. PATENT DOCUMENTS

| | | | |
|---|---|---|---|
| 1,603,437 | 10/1926 | Wingquist | 60/490 |
| 2,227,631 | 1/1941 | Carter | 60/491 |
| 2,417,218 | 3/1947 | Segsworth | 60/491 |
| 2,434,546 | 1/1948 | Breedlove | 60/491 |
| 2,535,267 | 12/1950 | Cline | 60/491 X |
| 2,673,448 | 3/1954 | Wheeler | 60/487 X |
| 2,685,255 | 8/1954 | Carner | 60/490 X |
| 2,738,649 | 3/1956 | Long | 60/491 |
| 2,991,619 | 7/1961 | Powell | 60/491 |
| 3,027,719 | 4/1962 | Keech | 60/491 |
| 3,740,954 | 6/1973 | Young | 60/491 X |
| 4,109,466 | 8/1978 | Keech | 60/491 X |
| 4,646,521 | 3/1987 | Snyder | 60/491 |
| 5,243,822 | 9/1993 | Vismara | 60/491 X |

FOREIGN PATENT DOCUMENTS

| | | | |
|---|---|---|---|
| 1555-572-A | 4/1990 | U.S.S.R. | 60/491 |
| 8905754 | 6/1989 | WIPO | 60/491 |

Primary Examiner—Hoang Nguyen
Attorney, Agent, or Firm—J. Michael Neary

[57] ABSTRACT

A method of pumping at a variable delivery flow rate and pressure includes rotating a pump rotor having a plurality of radially extending vanes inside a flexible cam ring with an input shaft and sweeping a swept volume within the flexible cam ring with the vanes while contacting an inside surface of the flexible cam ring with outside edges of the vanes. The swept volume is sealed on opposite axial sides thereof with a port plate on one side and a side seal plate on the side opposite the port plate, and opposite sides of the flexible cam ring and the vanes are engaged with the plates. Fluid is drawn into the swept volume within the cam ring through a first set of ports in the port plate by rotating the vanes into a suction region within the cam ring having an increasing radius in the direction of the vane rotation. The fluid is pressurized in a pressure region having a decreasing radius in the direction of vane rotation by rotating the vanes into a decreasing volume of the pressurizing region within the cam ring between the intake port and an abutment on the cam ring sealed to a output rotor, and the pressurized fluid is exhausted through a second set of ports in the port plate, circumferentially offset from the first set of ports. The delivery flow rate and pressure is varied by changing the cam ring cross-sectional shape from a round elliptical shape to a flatter elliptical shape by radially flexing the cam ring. The cam ring is flexed by exerting an inward radial force on the cam ring by moving at least one axial control rod positioned radially outside the cam ring in an axial direction, and converting the axial motion of the control rod into a radial force exerted on the cam ring of sufficient magnitude to flex the cam ring.

7 Claims, 33 Drawing Sheets

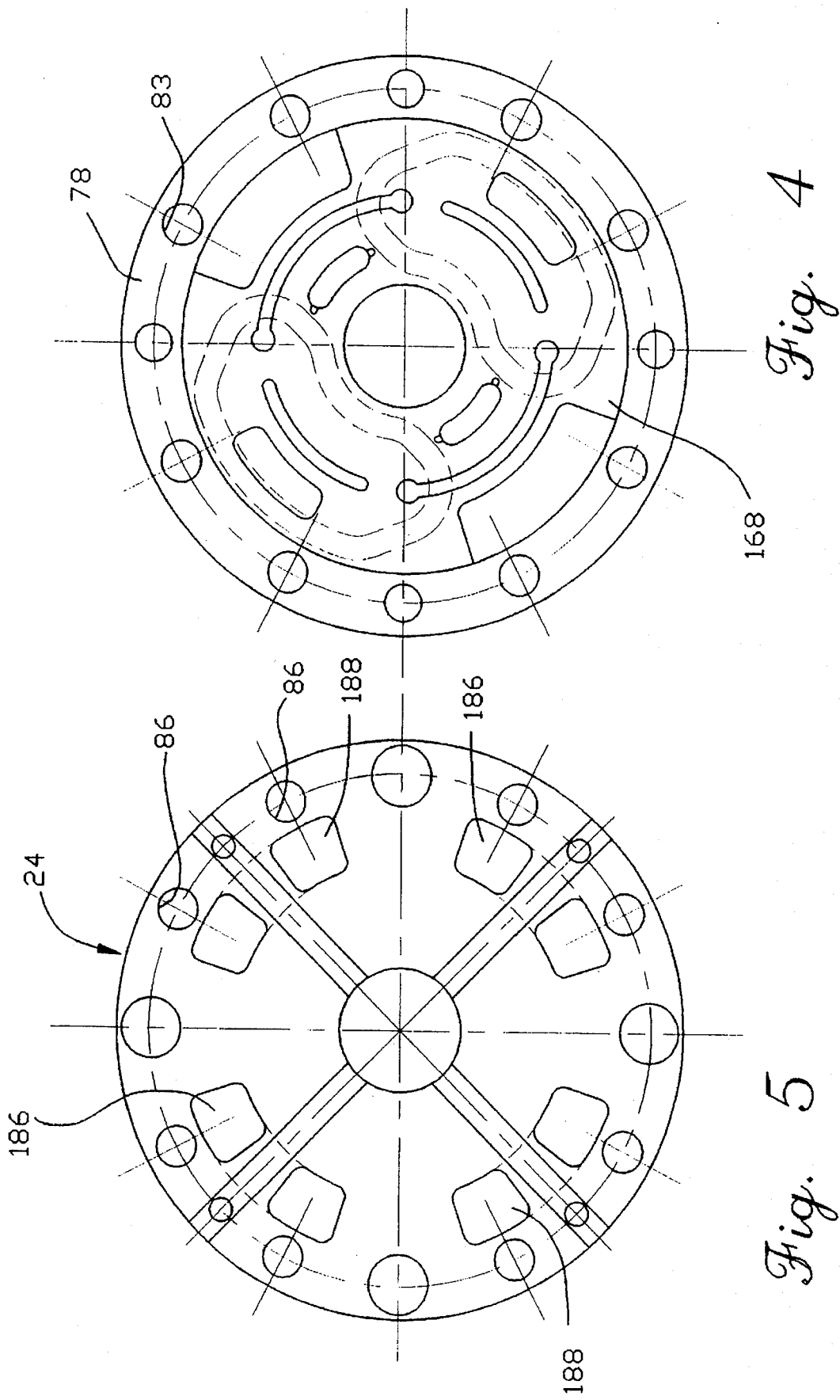

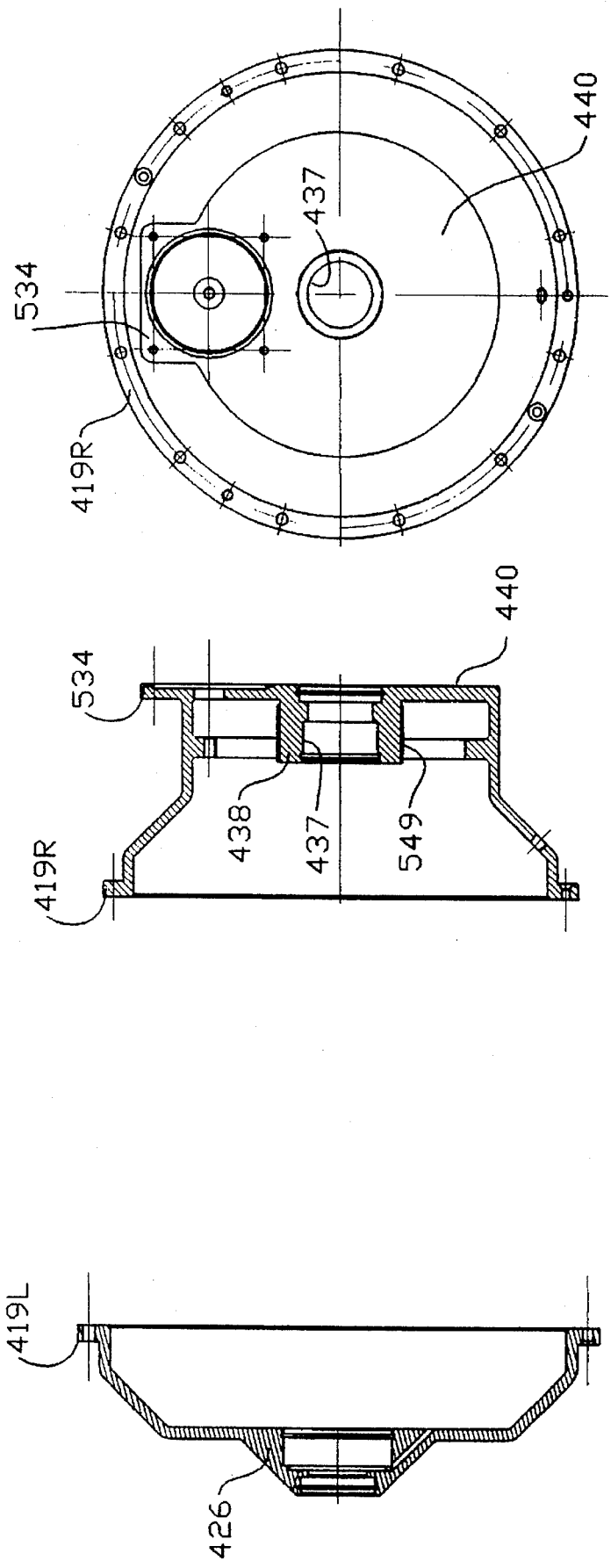

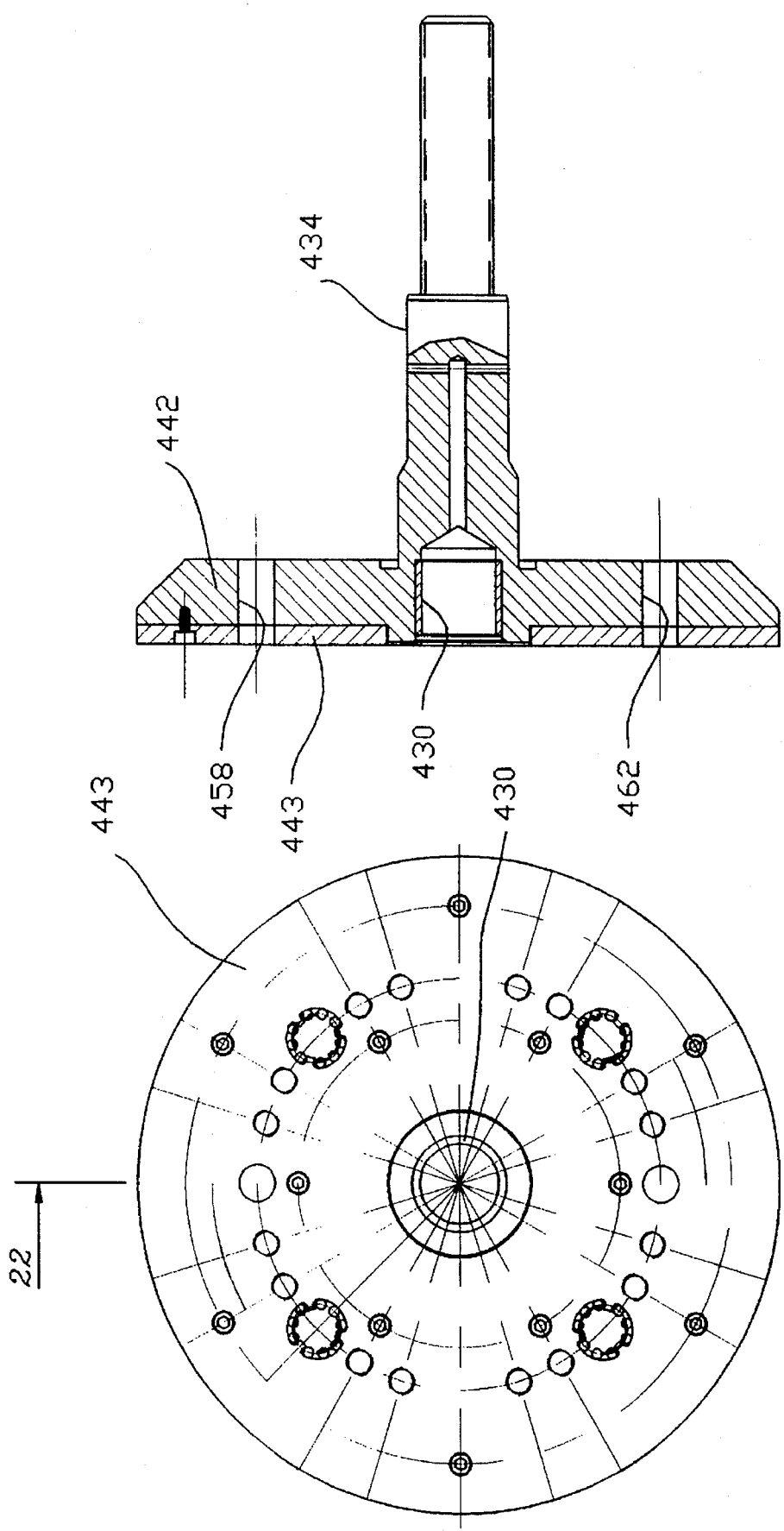

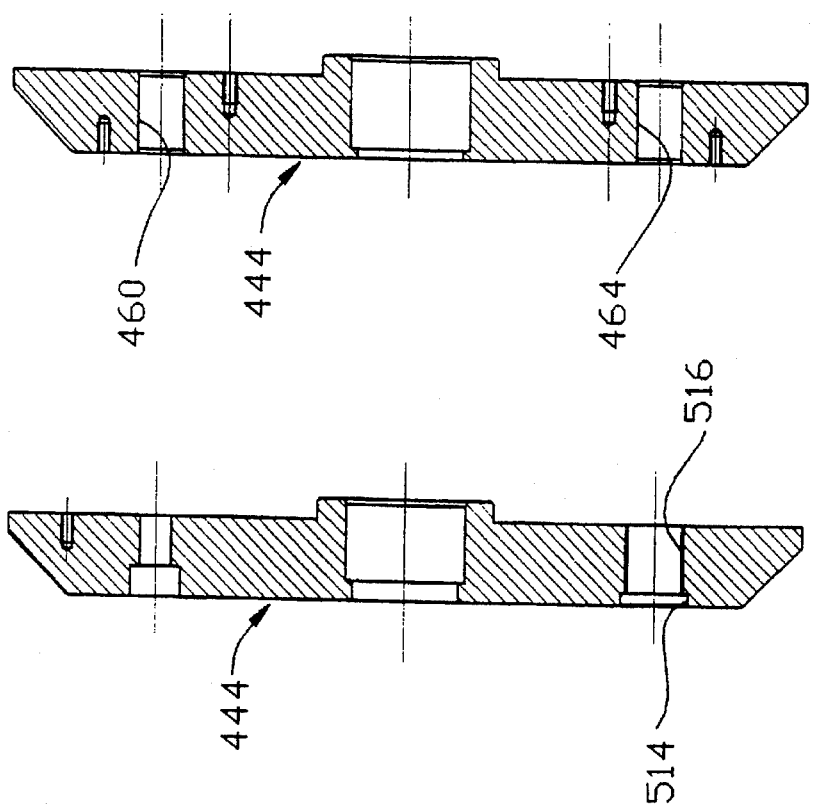
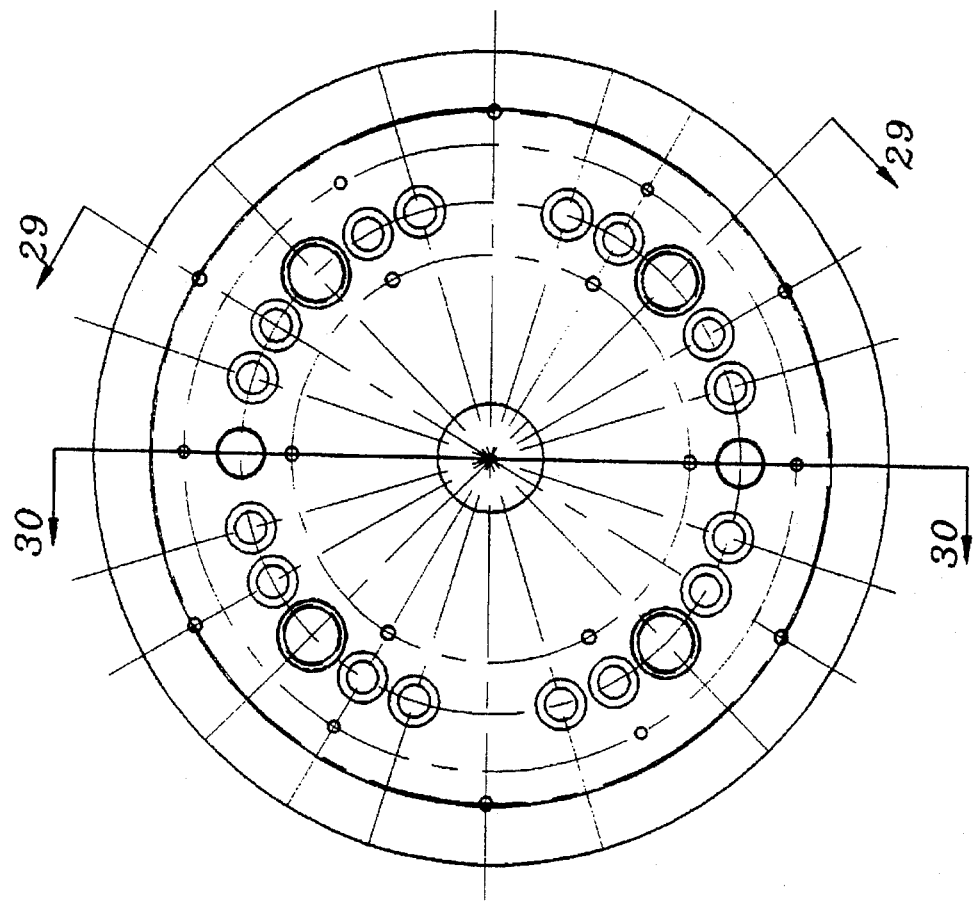

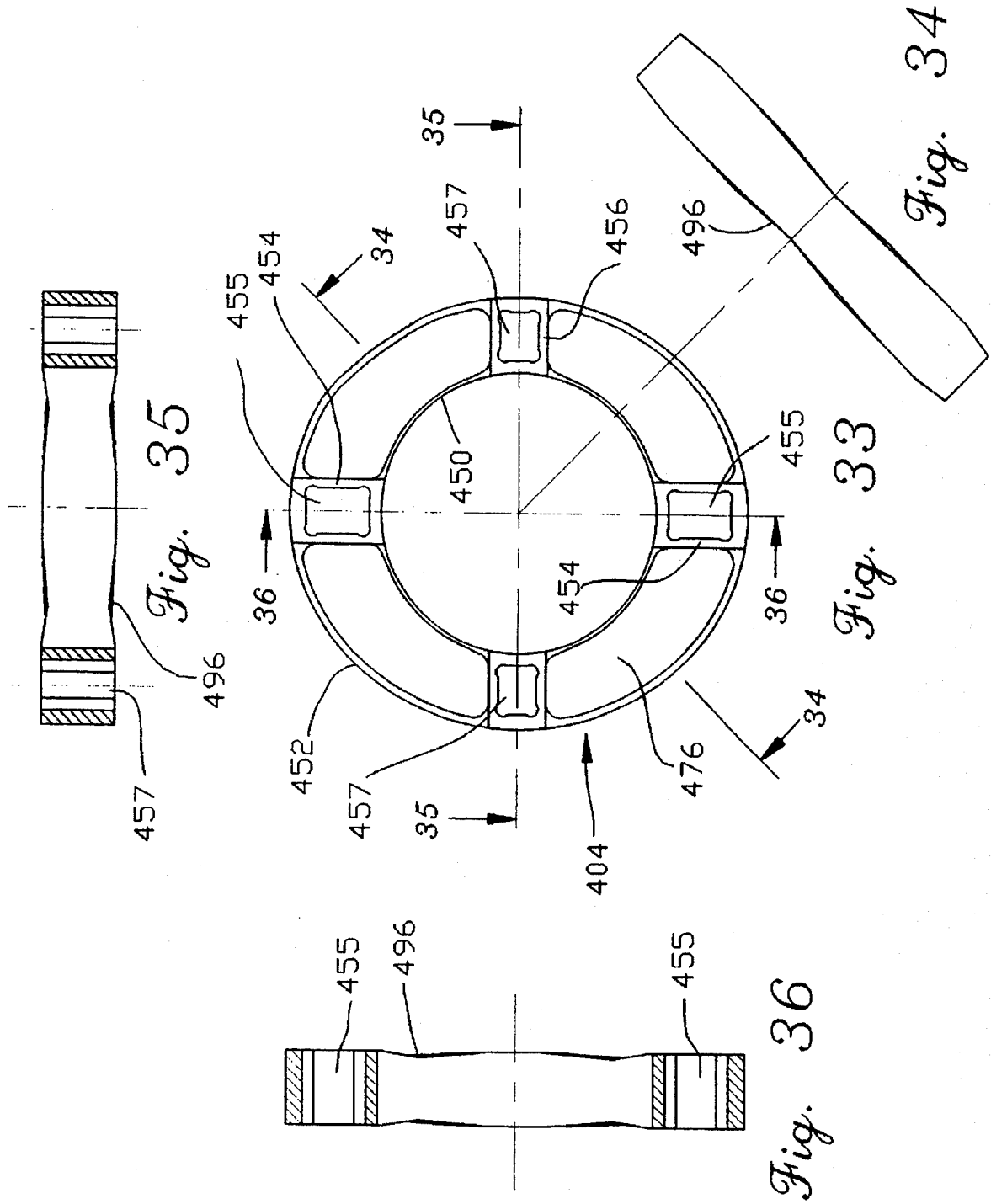

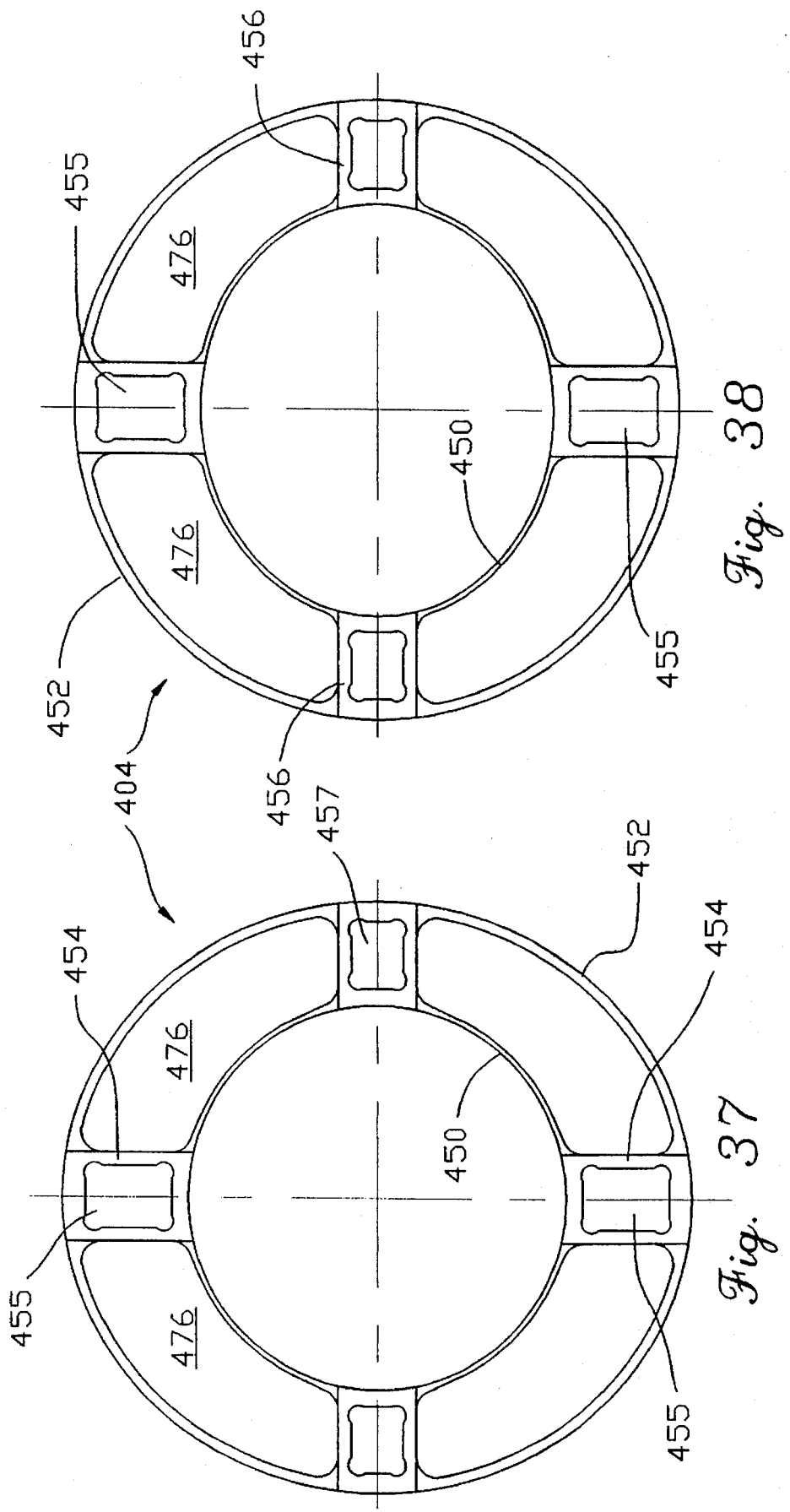

STROKE

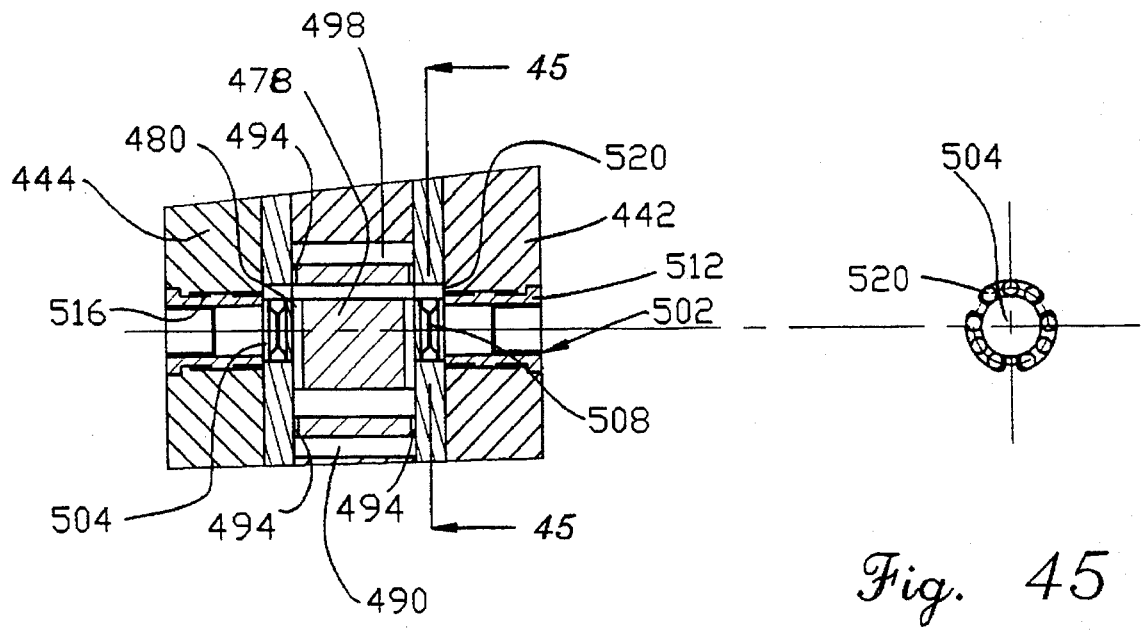
Fig. 44
Fig. 45
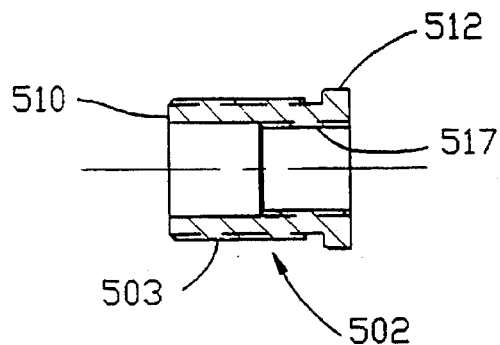
Fig. 46
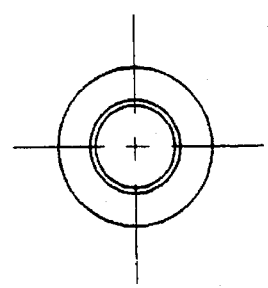
Fig. 47

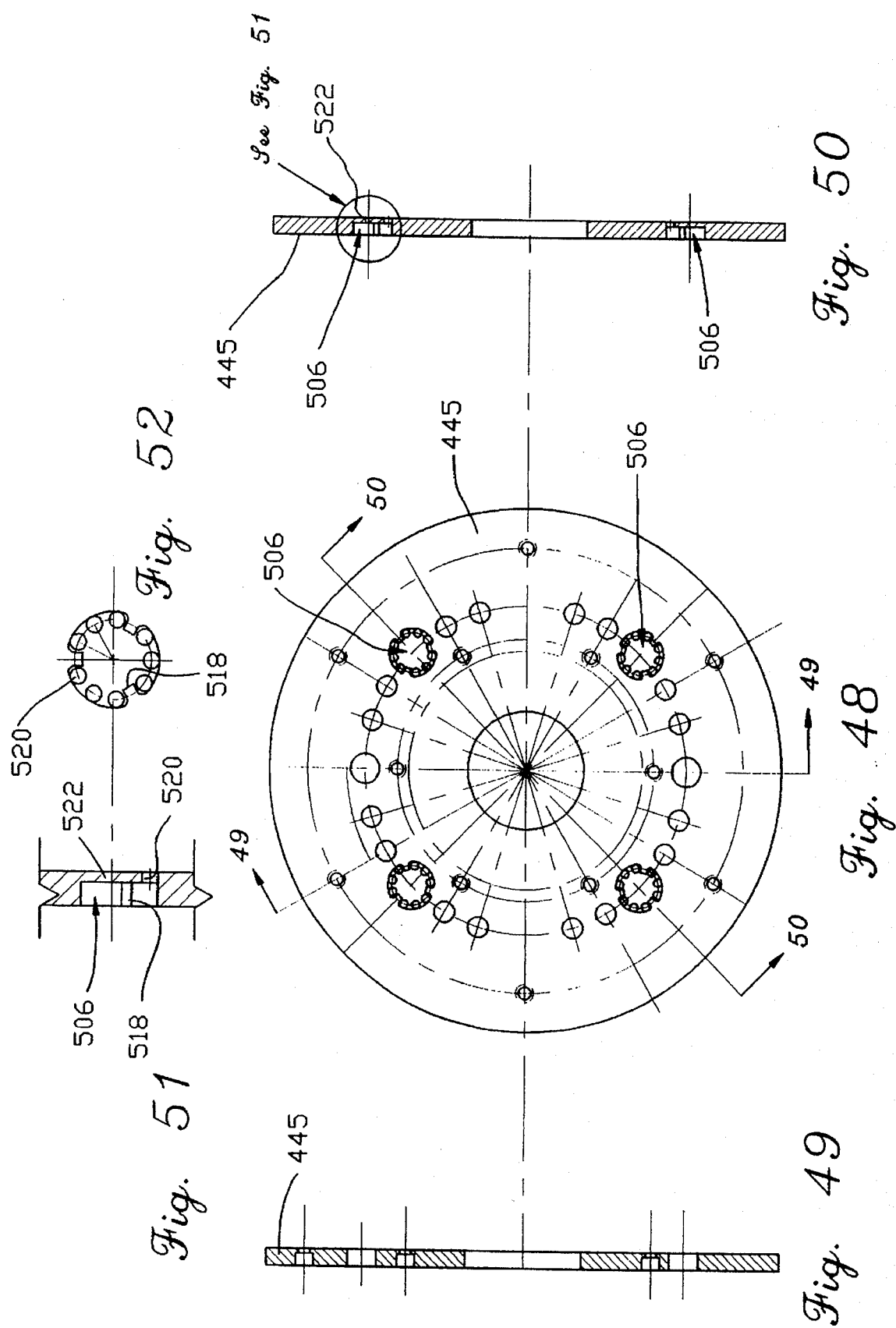

METHOD OF PUMPING WITH A VANE-TYPE PUMP HAVING A FLEXIBLE CAM RING

This is a continuation-in-part of U.S. patent application Ser. No. 08/093,192 filed on Jul. 13, 1993, entitled "Hydraulic Machine with Wedge-Shaped Swashplate", issued on Jun. 13, 1995 as U.S. Pat. No. 5,423,183, based on a PCT Application No. PCT/US92/00259 filed on Jan. 14, 1992, which in turn was a continuation-in-part of U.S. application Ser. No. 07/640,645 filed on Jan. 14, 1991, now abandoned.

BACKGROUND OF THE INVENTION

This application relates to a continuously variable hydraulic pump and motor, and to an infinitely variable transmission made by a mechanical and fluid coupling of the pump and motor, and more particularly to a vane type pump and motor of continuously variable displacement and a mechanical and fluid connection of the vane type pump and motor in a small, inexpensive, light weight infinitely variable transmission.

Many variable speed drive mechanisms of various designs are described in the literature or are commercially available. These mechanisms find application in fields as diverse as computers, machine tools, recreational vehicles, construction equipment, trucks and automobiles. They all share the basic function of converting the rotational speed and torque of an input shaft to a selected variable speed and torque at an output shaft.

The motor vehicle is an ideal application for an infinitely variable speed drive mechanism because of the improved economy and low exhaust emissions that can be obtained by operating the vehicle's prime mover, such as an internal combustion engine, in the range of its optimum operating point. Moreover, the potential market is enormous: it has been estimated that the annual world-wide market for automotive transmissions in the 15 years before 2005 will be in the vicinity of 47 million vehicles. Use of an efficient infinitely variable transmission in that number of vehicles would save an inestimable amount of fuel and reduce the world-wide exhaust emissions more than any other know conservation and air purity stratagem now considered feasible.

Although many infinitely variable transmissions and continuously variable transmissions have been proposed and designed for automotive application, none has proven entirely satisfactory. Traction devices have been unable to demonstrate acceptable life at the power levels required and the transient torque conditions occurring in a normal automotive driving cycle. Rubber belt variator devices, similar to snowmobile transmissions, have found limited application in special automotive areas, such as some mini cars, but the durability and efficiency of these devices are marginal at best, even in light vehicles with engine power on the order of only ten to fifteen horsepower. The most common application for this type of transmission is the snowmobile, where component life is not expected to exceed 100 hours.

Hydrostatic transmissions have existed for years and have been developed to a highdegree of sophistication. These devices are in use in some military, agriculture and construction equipment, mining and other off-the-road vehicles, and in small garden tractors. A conventional hydrostatic transmission has two principal elements: a hydraulic pump driven by the prime mover, and a hydraulic motor powered by hydraulic fluid pressurized by the pump for driving the load. Either or both of these elements may be variable displacement to achieve the variable gear ratio of the transmission. Regardless of the configuration selected, the overall system efficiency can be no better than the product of the efficiencies of the individual elements. For example, if both the pump and motor are 95% efficient, the hydrostatic unit cannot achieve efficiency greater than (0.95×0.95)=90% and in practice it is usually significantly less than this because of flow losses in the hydraulic lines coupling the two elements. This efficiency is inferior to that offered by conventional automatic transmissions which can operate at steady state efficiency levels on the order of 97%–98% with torque converter lock-up, but the advantages of an infinitely variable transmission and the absence of a clutch outweigh the disadvantage of low efficiency in the applications in which conventional hydrostatic transmissions have been used successfully.

In addition to their low operating efficiencies, there are other disadvantages that have militated against the wide use of conventional hydrostatic transmissions. They are usually bulky, heavy and expensive. In addition, conventional hydrostatic transmissions are noisy, especially at the higher gear ratios where most over-the-road driving is done because the flow rate of the hydraulic fluid is greatest at the high gear ratios in these hydrostatic transmissions.

The integrated hydrostatic transmission, in which the motor and pump are combined in one unit to minimize fluid flow losses, is a step in the right direction. However, none of the prior art integrated hydrostatic transmissions overcome the condition which degrades their efficiency and contributes to their noisiness, namely, that the peak power rating of the transmission is attained at maximum pressure and flow. As a consequence, hydraulic losses associated with pressure, such as leakage and hysterisis losses during fluid compression and expansion will be greatest at maximum power throughput. Also, viscous flow losses which are proportional to fluid velocities are greatest at peak power/speed when the flow and pressure are at their highest levels.

The lack of enduring commercial uses of hydrostatic transmissions in production for automotive or other uses that require a high power-to-weight ratio is believed to be due to four main reasons: 1) high cost, 2) high noise levels at normal operating conditions, (3) poor efficiency, and (4) lack of any significant weight and size advantage. However, modern production techniques have been developed that would make it possible to produce a hydrostatic transmission designed specifically for such applications at a cost approximately comparable to that of a prior art adjustable ratio variable transmission. The second and third factors, namely, noise and efficiency, have been the key factors discouraging adoption of a hydrostatic transmission by the automotive and recreational vehicle industries. The size and weight factors could be significant if there were competing designs that satisfied the first three factors.

One effort to overcome some of the disadvantages of the conventional hydrostatic transmission is the power branching transmission. An early example of such a transmission is shown in U.S. Pat. No. 3,175,363 to Hans Molly. The power branching transmission was intended to reduce the fluid flow losses associated with the hydrostatic transmission, particularly as the transmission ratio moves toward unity, by transmitting a portion of the input power mechanically to the output shaft. Since the proportion of mechanically transmitted power increases to 100% at a 1:1 transmission ratio, the hydraulic losses are potentially much less in a power branching transmission.

Unfortunately, attempts to commercialize the power branching hydrostatic transmission have been unsuccessful, probably because the complexity of the system would compromise performance and increase cost to a noncompetitive level versus the conventional transmission. Also, the prior art power branching transmissions have not been able to achieve a dynamic balance of the rotating elements which would be a serious shortcoming since substantial vibration levels at operating speed would not be acceptable. In addition, prior art power branching transmissions have not been readily scalable to make different sizes of a single design usable for different power ranges. Scalability could be an important feature in smaller applications such as snowmobiles and motorcycles where the ability to match the size, weight and cost of the transmission precisely with the power, torque and speed requirements could become competitively important.

If the power available in operation of a vehicle during braking and periods of low power requirements could be stored and made available for use during periods of auxiliary or high power requirements such as hydraulic power take-off, engine starting, and vehicle acceleration, the engine sizing for any given vehicle could be reduced substantially, since engines are normally sized for the maximum anticipated power requirements. The storage of hydraulic energy in an accumulator is a well known and understood technology and should encounter no resistance to use in motor vehicle applications as some new technologies have in the past, and the use of a moderately sized accumulator will add little weight and cost, certainly less than is saved by the use of a small light weight compact vane-type continuously variable transmission that makes possible the elimination of a clutch and a starter motor and makes possible the substantial downsizing of the engine because of the availability of the added hydraulic power source.

Thus, the transmission art has long needed an improved infinitely variable hydrostatic transmission that provides the advantages of the integrated hydrostatic transmission while markedly improving efficiency by reducing the hydraulic fluid losses associated with conventional hydrostatic transmissions, reducing the size, weight, cost, emissions and noise levels of operation, improving the performance near the neutral point, offering scalability of some basic machine designs, and reducing the manufacturing and maintenance costs.

SUMMARY OF INVENTION

Accordingly, it is an object of this invention to provide an improved dynamically balanced power branching transmission in which fluid losses are reduced to near zero at maximum power throughput for steady state operating conditions, resulting in overall operation efficiencies comparable or superior to conventional automatic transmissions, but which enables the engine to maintain an operating level at or near its optimum operating point. Another object of this invention is to provide an improved hydrostatic transmission that is small, light weight, quiet, durable, inexpensive to produce and service, and offers system efficiency in a motor vehicle that is comparable or superior to conventional automatic transmissions. Yet another object of this invention is to provide an improved method of converting power in a rotating input shaft at one speed and torque to nearly the same power in an output shaft at a different speed and torque.

These and other objects of the invention are attained in a power branching transmission which has fluid openings for flow of fluid directly between juxtaposed vane type pump and motor units, and an adjustable cam ring concentrically disposed in relation to each pump and motor unit. The cam rings are coupled to and drive an output shaft. The cam rings are driven by the fluid pressure generated in the pump to provide an infinitely variable transmission ratio for the unit in an efficient and simple manner. The transmission provides the capability of regenerative braking and accelerating, as well as engine starting using energy stored from the transmission.

DESCRIPTION OF THE DRAWINGS

The invention and its many attendant objects and advantages will be better understood on reading the following description of the preferred embodiment in conjunction with the following drawings, wherein:

FIG. 4 is a side elevation of an end cap and wear plate in the transmission shown in FIG. 1;

FIG. 5 is a side elevation of the port plate between the pump and stator units in the transmission shown in FIG. 1;

FIGS. 19 and 20 are sectional elevations of the two halves of the housing of the embodiment shown in FIG. 17;

FIG. 21 is an end elevation of the housing half shown in FIG. 20;

FIG. 22 is a sectional elevation of the output shaft in the embodiment of FIG. 17, along lines 22—22 in FIG. 23;

FIG. 23 is an end elevation of the output shaft shown in FIG. 22;

FIG. 28 is an end elevation of the inside face of the input-side end plate shown in FIG. 17;

FIGS. 29 and 30 are sectional elevations along lines 29—29 and 30—30 in FIG. 28;

FIG. 33 is a side elevation of the cam ring shown in the embodiment of FIG. 17;

FIGS. 34, 35 and 36 are side views of the cam ring along lines 34—34, 35—35 and 36—36 in FIG. 33;

FIGS. 37 and 38 are side elevations of the cam ring shown in FIG. 33 in unstrained and deformed conditions, respectively;

FIG. 44 is a partial sectional elevation through the check valve along the lines 44—44 in FIG. 18;

FIG. 45 is a partial sectional elevation through the check valve along the lines 45—45 in FIG. 44;

FIG. 46 is a sectional elevation of the check valve seat bushing shown installed in FIG. 44;

FIG. 47 is an end view of the seat bushing shown in FIG. 46

FIG. 48 is an end elevation of the wear plate on the input-side end plate shown in FIG. 17;

FIGS. 49 and 50 are elevations along lines 49—49 and 50—50 in FIG. 48;

FIG. 51 is an enlarged sectional elevation of the socket in the wear plate for one of the check valves;

FIG. 52 is an end view of the socket shown in FIG. 51;

FIGS. 55–56 are schematic diagrams of a hydraulic circuit using an accumulator for engine starting.

DESCRIPTION OF THE PREFERRED EMBODIMENT

Figure 1:
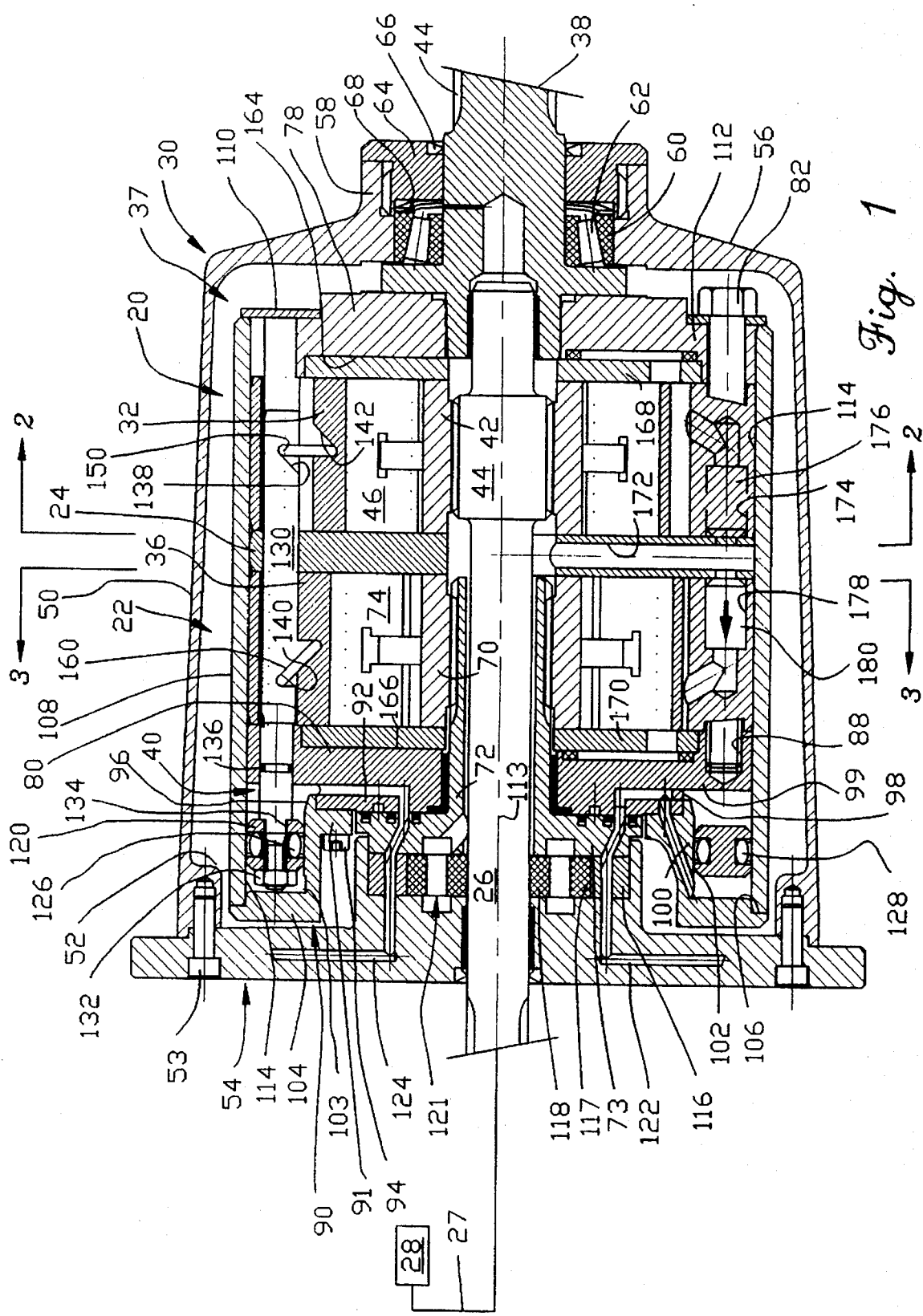
FIG. 1 is a side sectional elevation of a vane-type hydrostatic transmission in accordance with this invention, shown adjusted to produce a transmission ratio of 1:1.

Turning now to the drawings, wherein like reference numerals designate identical or corresponding elements, and more particularly to FIG. 1 thereof, a first embodiment of an infinitely variable vane-type hydrostatic transmission is shown having two tandem hydraulic vane-type units, a pump unit 20 and an axially juxtaposed stator unit 22, mounted on either side of a flat port plate 24 in a housing 30. The pump unit 20 is driven by an input shaft 26 which in turn is driven by a drive shaft 27 of a prime mover 28 mounted in an apparatus such as a machine tool, snowmobile, marine vessel, automobile, motorcycle, etc..

Fluid pressurized by the pump unit 20 acts on a pump unit cam ring 32 keyed to a pump output rotor 34, and also communicates directly through the port plate 24 to act on a stator unit cam ring 36, in turn keyed to a stator output rotor 35. The output rotors 34 and 35 are bolted together to form a rigid back-up sleeve of a rotating assembly 37 which is connected to an output shaft 38 for coupling torque exerted on the output rotors 34 and 35 to the output shaft 38. A control mechanism 40 is coupled to the pump cam ring 32 and the stator cam ring 36 to change the cross-sectional shape of the cam rings 32 and 36 and thereby vary the transmission ratio of input speed and torque to output speed and torque.

The prime mover 28 is typically an internal combustion engine, such as a diesel, two-cycle, four-cycle, rotary or turbine engine, which operates most cleanly and efficiently within a narrow band of engine speed. The continuously variable transmission of this invention enables the transmission of power to driven applications at infinite gradations of speed from zero to 1:1 (the input speed to the transmission) while the prime mover operates continuously at its optimum operating point.

A pump rotor 42 is mounted for rotation on a spline section 44 of the input shaft 26 for driven rotation thereby. Ten radially projecting pump vanes 46 are mounted on the pump rotor 42 for rotation therewith and for limited radial sliding movement to enable the vanes 46 to follow the inner surface 48 of the pump cam ring 32. The number of pump vanes 46 will vary, depending on the power capacity of the pump unit 20. Typically, for a transmission designed to operate at a moderate system pressure of 2000 PSI and a power capacity of 100 HP, a pump rotor with 10 vane would be used.

The housing 30 includes a cylindrical body 50 which may taper slightly for manufacturing convenience. The body 50 is provided with bosses 52 at an input end which are drilled and tapped for receiving screws 53 for attaching a mounting flange 54 to the housing 30, which closes and seals the flange end opening of the housing 30. The transmission is connected to the apparatus in which it is to be used by attaching the mounting flange 54 to the prime mover 28 or other structure of the apparatus by way of holes (not shown) or other conventional attachment means on the flange 54.

The opposite end, the output end, of the housing 30 is necked down at 56 and terminates in a smaller diameter barrel 58 having an axial cylindrical opening 60 in which is mounted a conical roller element bearing 62 in which the output shaft is journaled for rotation. The housing 30 may be made of cast, welded or superplastically formed aluminum, cast iron, or other low cost material, since it does not carry any significant structural loads.

The housing body 50 is closed at its output end barrel 58 with an annular end cap 64 that has an axial opening for receiving the output shaft 38. A seal 66 in the end cap 64 outboard of the bearing 62 prevents leakage of hydraulic fluid out of the housing 30 around the output shaft 38. A wave spring 68 is provided between the end cap and the bearing 62 to preload the rotating assembly against the rotating seal interface at the input end.

Figure 3:
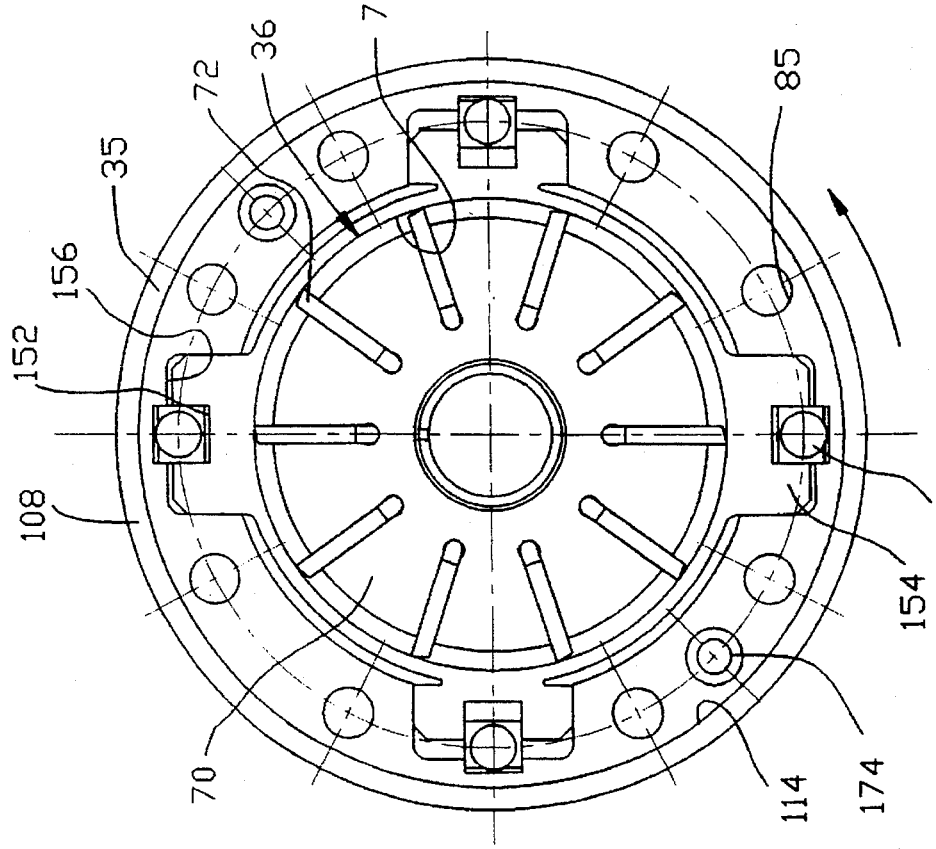
FIG. 3 is an axial sectional elevation of the stator section of the transmission shown in FIG. 1 along lines 3—3.

The stator unit includes a stator hub 70 mounted on splines at the distal end of a ground shaft 72, which has an end flange 73 that is attached to the mounting flange 54, so that the stator hub 70 is fixed relative to the housing 30. A plurality of stator vanes 74, shown in FIG. 3 as ten vanes 74, are mounted in radial slots in the stator hub 70 for radial sliding movement to accommodate the varying radial distance to the inside surface 76 of stator cam ring 36.

The rotating assembly 37 includes a pair of structurally similar end caps 78 and 80, one on each axial end of the tandem pump and stator units 20 and 22, respectively. The end caps 78 and 80 are coupled axially by eight circumferentially spaced tie bolts 82 (only one of which is seen in FIG. 1) which extend through axial holes 83 in the pump side end cap 78, through aligned holes 84 in the pump output rotor 34 and holes 85 in the stator output rotor 35, and also through aligned holes 86 in the port plate 24. The bolts 82 are threaded into tapped holes 88 in the stator side end cap 80 to secure the end caps axially and bear the force exerted by fluid pressure within the rotating assembly 37. The housing is thus not subjected to the stresses incident to containment of high pressure fluid within the pump and stator units, so the housing can be made as a relatively light weight and inexpensive structure An annular control housing 90 has an inner flange 91 that is fastened to a thick section 92 of the stator side end cap 80 by screws 94. The control housing 90 has an axial lip 96 which overlaps a step 98 formed in the end cap 80 at the radial outer extent of the thick section 92, at its junction with a radially outer stepped section 99, for accurate placement and retention of the control housing on the end cap 80.

The control housing has a cylindrical, axially extending intermediate section 100 having a cylindrical outer surface 102 that is accurately machined to function as the inner surface of an annular control cylinder 103 for the control mechanism 40. The control housing terminates in a radial end flange 104 having a rabbet 106 cut radial outside edge for receiving one end of a cylindrical sleeve 108 which forms the outer shell of the rotating assembly 37. The sleeve 108 is clamped between the rabbet 106 on the control housing end flange 104 and an annular sleeve retainer 110 held against the stepped outer section 112 of the output side end cap 78 by the bolts 82. The port plate 24, disposed between the axially juxtaposed pump unit 20 and the reaction stator unit 22, and both output rotors 34 and 35, as well as the end caps 78 and 80 all extend radially outward to the sleeve 108 and are contained therein, maintaining the the elements in concentric alignment around the axis 115 of the machine. The cylindrical inner surface 114 of the input end of the sleeve 108 forms the outer cylindrical surface of the control cylinder 103 of the control mechanism 40.

An annular piston 120 is positioned in the annular control cylinder 103 for axial movement therein under control of fluid pressure from a conventional gerotor make-up pump 121 driven by the input shaft 26 and selectively exerted on opposite axial faces of the piston 120 through fluid ducts 122 and 124. The gerotor pump 121 has an external cam ring 116 in which an outer gear 117 rotates. An internal gear 118, having one fewer teeth than the outer gear 117, drives the outer gear 117 which revolves around the internal gear while pressurizing fluid in the working space between the inner and outer gears 118 and 117. A control system 125, shown in FIG. 6 and described below, governs the selective delivery of control fluid through the ducts 122 and 124. Two radially spaced seals 126 and 128 in annular grooves in the piston 120 seal the piston 120 in the cylinder for sliding movement therein. Four control rods 130, circumferentially spaced around the rotating assembly 37, are fastened to the annular piston 120 by nuts 132 threaded onto threaded ends of the control rods 120 and holding a shoulder 134 of a stepped end of the control rods 130 against the inner face of the annular piston 120.

Figure 2:
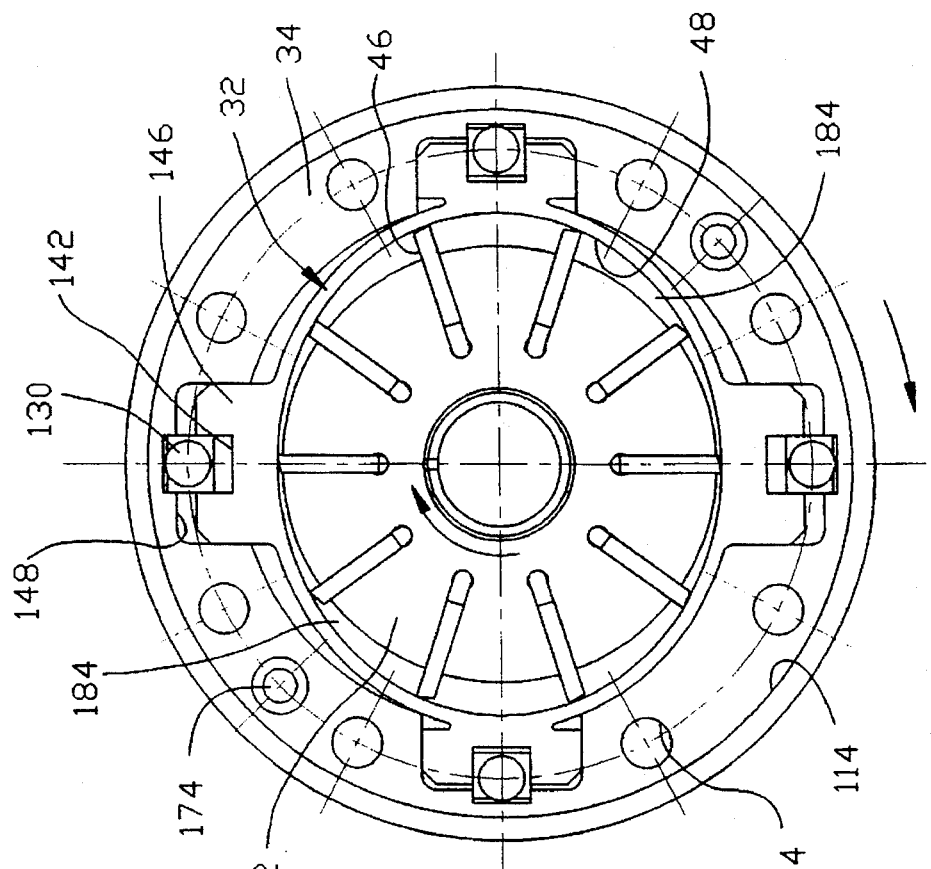
FIG. 2 is an axial sectional elevation of the pump section of the transmission shown in FIG. 1 along lines 2—2.

The control rods 130 extend axially through aligned holes in the two end caps 78 and 80, in the pump and stator output rotors 34 and 35, and the port plate 24. An "O" ring 136 on each control rod 130 seals the clearance between the rods 130 and the holes in the stator side end cap 80 to prevent leakage of pressurized fluid therethrough. Each control rod 130 has a pair of inwardly opening wedge-shaped notches 138 and 140 positioned in radial alignment with the centerline of the output rotors 34 and 35, respectively. The notch 138 has an upright left side and a sloping right side, hence will be referred to as a "right sloping" notch. The notch 140 has an upright right side and a sloping left side, hence will be referred to as a "left sloping" notch. The top and bottom control rods 130 T and 130B shown in FIGS. 2 and 3 and identical to the top control rod 130 shown in FIG. 1. The side control rods 130S have the same kind of notches 138 and 140, but the upright and sloping sides are switched. That is, the notch 138S in the side control rods 130S is a "left sloping" notch as described above, and the notch 140S is a "right sloping" notch.

A complementary wedge-shaped notch 142 is provided in each of four radially projecting tenons 146 on the pump cam ring 32. The tenons 146 extend into radially opening channels 148 on the pump output rotor 34 and provide a radially slidable torque coupling by which the pump cam ring 32 is keyed to the pump output rotor 34. The notches 138 and 142 receive toggles 150 by which axial motion of the control rods 130 is converted to radial translation of the tenons 146. Similarly, a complementary wedge-shaped notch 152 is provided in each of four radially projecting tenons 154 on the stator cam ring 36. The tenons 154 extend into radially opening channels 156 on the stator output rotor 35 and provide a radially slidable torque coupling by which the stator cam ring 36 is keyed to the stator output rotor 35. The notches 140 and 152 receive toggles 160 by which axial motion of the control rods 130 is converted to radial translation of the tenons 154. The control rods 130 all hav a square cross-section where they extend through the tenons 146 and 154 and fit closely in the notches in those tenons to ensure that the control rods do not turn and misalign the notches in the control rods 130 with the toggles which they are supposed to operate.

Each of the end caps 78 and 80 has a stepped axially facing surface providing an annular, axially facing recess 164 on end cap 78, and another annular, axially facing recess 166 on the end cap 80 for receiving wear plates 168 and 170, respectively. The wear plates 168 and 170 provide replaceable wear surfaces for the end caps 78 and 80, and also provide lubrication and pressure balancing channels in a manner known in the vane pump art. The fluid pressure on both sides of the cam rings 32 and 36 is balanced as shown in FIGS. 1 and 4, and in other corresponding figures for the other tandem units shown in FIGS. 1–16. The slots in the side plates 168 and 170 communicate through to balancing basins on the outside faces of the side plates to provide axial fluid balancing and wear compensation of the side plates, and also communicate through four circumferentially spaced ports near the outer radial edge of the side plates to allow fluid communication around the edge of the cam rings to the spaces radially outside the cam rings to provide radial fluid balance on both radial surfaces of the cam rings 32 and 36.

Four radial holes 172 are drilled in the port plate 24 which communicate with axial holes 174 in the pump output rotor 34 containing check valves 176. Similar axial holes 178 in the stator output rotor 35 receive check valves 180. Fluid pressurized in the make-up pump 121 flows through an annular space between the ground shaft 72 and the input shaft 26 and then through the radial holes 172 in the port plate 24 where it is available to be drawn into the pump and stator working volumes to make up for fluid leakage out of the pressurized volumes in the pump and stator.

In operation, the housing 30 is filled with hydraulic fluid and the input shaft 26 is driven by a prime mover 28 such as an engine or motor. Assuming that it is desired to drive the output shaft 38 initially at a slow speed with high torque, as would be done in the case of starting up most applications such as vehicles, marine vessels, machine tools or engine powered equipment, the transmission is initially set in the neutral position, wherein the annular control piston 120 is positioned to its right-most position, or about 0.25" to the right from the 1:1 position shown in FIG. 1. The control piston 120 is positioned by delivering pressurized control fluid from a control valve 182 in the control system 125, shown in FIG. 6, through the control duct 122. The duct 122 passes through the mounting flange 54, through the outer cam ring 116 of the make-up pump 121, and through the end flange 73 of the ground shaft 72. An outer annular groove in the input side face of the thick section 92 of the end cap 80 is radially aligned with the portion of the control duct 122 opening in the output-side face of the ground shaft end flange 73, and communicates through a radial portion of the duct 122 in the end cap 80 and a diagonal portion through the control housing with the control cylinder 103 adjacent the end flange 104 of the control housing 90.

Control of the axial motion of the annular piston 120 toward the flange end of the control cylinder 103 is by way of the control duct 124 which also passes through the mounting flange 54, through the outer cam ring 116 of the make-up pump 121, and through the end flange 73 of the ground shaft 72. An inner annular groove in the input side face of the thick section 92 of the end cap 80 is radially aligned with the portion of the control duct 124 opening in the output-side face of the ground shaft end flange 73, and communicates through a radial portion of the duct 124 in the end cap 80 directly with the control cylinder 103 between the annular piston 120 and the end cap 80. The control cylinder 103 is thus in continuous fluid communication through portions of the ducts 122 and 124 in the rotating end cap 80 with the portions of the ducts 122 and 124 through the stationary ground shaft end flange 73.

At the right-most position of the control piston 120 and the attached control rods 130, that is, at the position of the control piston 120 shifted farthest from the end flange 104 of the control housing 90, the top and bottom pump toggles 150 engaged with the top and bottom control rods 130 will be lying at about 45° to the right, and the top and bottom stator toggles 160 engaged with the top and bottom control rods 130 will be upright. At the same time, the side pump toggles 150S will be lying over 45° to the left in a position identical to that shown in FIG. 1 for the toggles 160, and the side stator toggles 160S will be in a position perpendicular to their control rods 130, in a position identical to that of the pump toggles 150 shown in FIG. 1. In this position of the control piston 120, the cross sectional shape of the pump cam ring 32 is circular (like the shape of the stator cam ring 36 shown in FIG. 1) and the shape of the stator cam ring 36 is elliptical (like the shape of the pump cam ring 32 shown in FIG. 1.)

In the neutral position, the input shaft drives the pump rotor 42 and the pump rotor vanes 46 sweep around the pump working volume, which is the volume between the pump cam ring 32 and the pump rotor 42, and between the port plate 24 and the wear plate 168. However, since the pump working volume is cylindrical and co-axial with the pump rotor 42, there is no displacement. Essentially, a cylindrical annulus of fluid merely rotates around the circular pump cam ring 32 with the pump rotor 42. The only output torque exerted on the output shaft 38 in the neutral position of the transmission is produced by the friction force of the pump vanes 46 exerted on the pump cam ring 32, the port plate 24 and wear plate 168 as the vanes 46 travel around the pump working volume.

To begin applying power through the transmission to the wheels of the vehicle or other driven application, fluid pressure is applied by the control valve 182 through the control duct 124 to the portion of the control cylinder between the piston 120 and the end cap 80, and the control valve 182 vents the control duct 122 to sump. The control fluid from the control duct 124 moves the piston 120 toward the end flange 104 and pulls the control rods in the same direction. The pump toggles 150 are rocked by the control rods 130 to the right, camming the pump cam ring 32 inward to an elliptical shape. Simultaneously, movement of the side control rods 130S rocks the toggles 150S to the right to allow the tenons 146S on the sides of the pump cam ring 32 to advance radially outward into the channel 148S to facilitate the change of shape of the cam ring 32 from circular to elliptical. The change of shape of the cam ring from circular to elliptical changes the form of the pump working volume from an annular cylinder to a wider, shorter shape, with a cross section thinner at its top and bottom and thicker at its sides. Rotation of the pump vanes through the pump working volume of this cross-sectional shape pressurizes fluid in two oppositely disposed pressure sectors 184, each having a tapering cross section, and causes suction of fluid into the two oppositely disposed suction sectors, each having a flaring cross section. The "tapering" and "flaring" descriptions are from the perspective of the vanes 46 moving in the sectors. A "tapering" sector is one in which the vanes 46 are moving into their slots in the rotor 42 and the volume of the pump working volume between adjacent vanes is decreasing as the rotor 42 rotates. A "flaring" sector is one in which the vanes 46 are moving out of their slots in the rotor 42 and the volume of the pump working volume between adjacent vanes is increasing as the rotor 42 rotates. Thus, the volume between adjacent vanes 46 in the tapering pressure sectors 184 decreases as the vanes rotate through those sectors, thereby pressurizing the fluid in those volumes, and increases as the vanes rotate in the flaring sectors, thereby producing a suction of fluid into those volumes..

Fluid pressurized in the pump working volume by the pump vanes 46 contributes toward output torque in two ways: its pressure is exerted against the radial faces of the tenons 146 in the pressure sectors 184. The pressurized fluid thus exerts a hydraulic force on the pump cam ring 32 equal to the product of the fluid pressure and the effective area against which the pressure acts in the circumferential direction. This effective area is the product of the axial length of the cam ring and the difference between the exposed radial surface of the tenons 146 on the two circumferential limits, 90° apart, of the pressure sectors 184..

Fluid pressurized by the pump in its pressure sectors 184 is displaced therefrom through pressure ports 186 in the port plate 24 directly into the stator unit 22 where it acts on the tenons 154 of the stator cam ring 36 in tapering sectors of the working volume to produce torque that is transmitted to the stator output rotor 35 by engagement of stator tenons 154 on the stator can ring 36 in channels 156. The pressurized fluid in the tapering sectors of the stator working volume acts on the stator cam ring 36 in exactly the same way to produce output torque to the output rotor 35, with the exception that the stator hub 70 and its vanes 72 do not rotate; the stator output rotor 35 rotates relative to the stator hub 70 and vanes 72 along with the rest of the rotating assembly 37 in the direction of rotation indicated by the direction arrow in FIG. 3. The function of the stator vanes is to divide the stator working volume into smaller sectors to prevent pressurized fluid in the pressurized sectors, wherein the working volume decreases in the direction of rotation of the stator output rotor 35, from flowing into the suction sectors, wherein the working volume increases.

The fluid displaced by the relative rotation of the stator rotor 35 and the stator hub 70 and vanes 72 is conveyed directly through ports 188 in the port plate 24. Because of the reciprocal relationship of the positions of the pump cam ring 32 and the stator cam ring 36, established by the fixed inverse positions of the toggles 150 and 160 on the control rods 130, the displacement of the pump unit 20 is always almost exactly identical to the suction volume of the stator unit 22. This is true even though the pump cam ring 32 rotates in the same direction as the pump rotor 34, and therefore has a lower displacement than such a pump with a non-rotating cam ring would have, because the stator cam ring 36 is also rotating in the same direction at the same speed, so the suction demands of the stator working volume are correspondingly lower. The displacement from the pump as the cross-section approaches the greatest difference between major and minor axis dimensions actually decreases because the stator displacement decreases as the stator cam ring becomes more circular. Since the available volume in the stator unit 22 is limited, and there is no other path in which the fluid driven by the pump vanes 46 can flow, it drives the pump cam ring 32 in the same direction of rotation as the pump rotor 42 instead of flowing out of the pump working volume.

Increases in the output speed of the transmission and corresponding decreases in the transmission ratio toward 1:1 are achieved by moving the control piston 120 further and further to the left until the 1:1 position illustrated in FIG. 1 is reached. The fluid flow rate between the pump and stator units 20 and 22 reaches a maximum in a mid-range of the transmission ratio, it then declines toward zero when the transmission ratio approaches 1:1. This is the ratio where most driving is done, and provides maximal efficiency and minimal noise because fluid flow losses and noise generated in this transmission are minimal.

The friction force exerted by the pump vanes 46 on the pump cam ring 32, the wear plate 78, and the port plate 24 would, in conventional vane pumps, be reacted through the housing to ground, and would be wasted. In this invention, however, this friction force is coupled to the output shaft 38 and thus contributes to the output torque.

The Second Embodiment

Turning now to FIGS. 7–16, an electrically controlled, tandem, vane-type continuously variable transmission is shown having a housing 200 including a cylindrical body 202 having an input end connected to a mounting flange 204 by screws 206, and having an output end connected to an output end closure 208. A ground shaft 210 has an end flange 212 that is rigidly fastened in a recess 214 in a thickened center portion 216 of the mounting flange 204 by screws 218. The ground shaft has a tubular portion 220 that projects axially into the housing 200 and receives an input shaft 222, journaled therein at the flange end of the ground shaft in a journal bearing 224.

The input shaft 222 has an input end with a torque coupling structure such as the spline 226 for connection to an output drive shaft 27 of a prime mover 28. The input shaft 222 has a distal end 228 journaled in a bearing 230 mounted in an axial opening 232 in the center of an end cap 234 at the output end of a rotating assembly 236. The rotating assembly 236 includes a pump unit 238 and a stator unit 240 disposed on opposite sides of a flat port plate 242 and between the output-end end cap 234 and an input-end end cap 244. A suitable number of circumferentially spaced bolts 246 (this embodiment is designed to use twelve such bolts) secure the rotating assembly 236 to an inner end flange 248 of an output shaft 250, mounted for rotation in bearings 252 in the end closure 208, and hold the pump and stator units between the end caps, reacting the outward axial forces exerted by pressurized fluid in the pump and stator units 238 and 240. The output shaft has an end section 253 that is splined for torque transmitting connection to a driven application, such as a vehicle drive shaft for driving the wheels of the vehicle.

The pump unit 238 has an annular pump rotor 254 having an inside spline engaged in a torque transmitting coupling with a spline section 256 on the input shaft 222 adjacent to the distal end 228. The pump rotor 254 has a series of radial slots 258 regularly spaced circumferentially around the rotor, each slot 258 slidably receiving a radially projecting pump vane 260. Ten slots are provided in the disclosed embodiment, but other numbers of vanes can be used. The number of vanes is primarily determined by the maximum number of vane slots 258 that can be fit into the available space on the rotor 254. The pump vanes 260 are driven by the pump rotor 254 around a pump working volume 262 to pressurize hydraulic fluid in the working volume for operation of the transmission. The working volume is confined radially between the outside cylindrical surface 264 of the pump rotor 254 and an inside surface 266 of a pump cam ring 268 radially spaced from and surrounding the pump rotor. The axial confines of the pump working volume 262 are the output-side face 269 of the port plate 242 and an inner face of a wear plate 270 mounted in an annular recess in the inner face of the end cap 234.

Fluid pressurized in the pressure sectors of the pump unit 238 acts directly against the tenons 296 of the pump cam ring 268 in the same manner as the embodiment of FIG. 1 to produce torque, and also passes through pressure ports 272 in the port plate 242 directly into the working volume 274 in the stator unit 240. The stator working volume is the space limited radially between the outside cylindrical surface 276 of a stator hub 278 and an inside surface 280 of a stator cam ring 282. The axial boundaries of the stator working volume 274 are the stator-side face 284 of the port plate 242 and the surface of a wear plate 286 mounted in an annular recess in the input-end end cap 244.

Fluid pressurized in the pump unit 238 and pressurizing pressure sectors in the stator working volume 274 acts against the tenons 298 of the stator cam ring 282 to produce torque in the same manner as that described for the embodiment of FIG. 1, and is reacted by ten stator vanes 288 slidably mounted in radial slots in the stator hub 278. The pressure force reacted by the stator vanes 288 passes through the stator hub 278 to a spline connection 290 at the distal end of the ground shaft tubular extension 220 and thence back to the mounting flange 204.

The pump and stator cam rings 268 and 282 are keyed to pump and stator output rotors 292 and 294, respectively, by four radial tenons 296 on the pump cam ring 268 and four radial tenons 298 on the stator cam ring 282 that slide radially in channels 300 and 302 in the pump and stator output rotors 292 and 294. Torque is transmitted between the cam rings 268/282 and the rotors 292/294 by engagement of the circumferentially facing surfaces of the tenons 296/298 with the circumferentially facing surfaces in the channels 300/302 during transmission of torque through the transmission, and during back-driving from the output shaft to charge a hydraulic accumulator during recovery of braking energy, as will be described below in connection with the third embodiment of FIGS. 17 and 18.

A set of aligned axial holes is provided through both end caps 234 and 244, through both output rotors 292 and 294, and through the port plate 242 on diametrically opposite sides of the rotating assembly 236, for receiving two control rods 304. Each of the control rods 304 has two oppositely sloping wedge-shaped notches 308 and 310 which receive one end of two toggles 312 and 314, the other ends of which are received in complementary notches in abutments 316 and 318 formed on the pump cam ring 268 and the stator cam ring 282 adjacent an opposed pair of tenons 296 and 298 for distributing the radial force exerted by the toggles 312 and 314 on the cam rings. This embodiment differs from the embodiment of FIG. 1 in part by the use of only two control rods 304, whereas the embodiment of FIG. 1 has four control rods 130. This embodiment utilizes the spring-back or restoring force exerted by the material of the cam rings 268 and 282 after it is flexed to the elliptical shape shown in FIGS. 11 and 12 by the toggles 312 and 314. Typical materials that would provide sufficient tensile strength to give an adequate spring-back force are 4140 tool steel and 17-4 PH stainless steel.

Another difference between this embodiment and that of FIG. 1 is that the notches 308 and 310 in the control rods and the toggles 312 and 314 are arranged to shift the transmission from neutral toward 1:1 with a push on the control rods 304 whereas the embodiment of FIG. 1 accomplished that result with a pull on the control rods 130. For that reason, the wedge-shaped notches 308 and 310 on the control rods 304 slope in the opposite direction from the direction that the notches on the control rods 130 in the embodiment of FIG. 1 slope. Specifically, the notches 308 and 310 slope away from each other so that a push on the control rod 304 tends to cock the toggle 312 toward the vertical position and distort the pump cam ring 268 toward and elliptical cross-section, and tends to cock the toggle 314 toward a 45° position (shown in. FIG. 1:1) and allow the stator cam ring 282 to spring back toward its unstrained circular cross-section.

Axial control movement of the control rods 304 is by way of a control motor 320 which is coupled to the control rod 304 by a linkage including a control lever 322 and a spider 324. The motor 320 is a servo motor or a stepper motor mounted on pivot pins for swiveling through a small vertical arc between two spaced ears 326 attached to the cylindrical body 202 as by welding or other suitable means of attachment. The motor 320 drives a threaded rod 328 that is threadedly engaged with a internally threaded sleeve 330 pinned for swiveling through a small vertical arc between two upright arms of a fork 332. The fork 332 is attached by a vertical screw 334 to the end of the lever 322.

Figure 7:
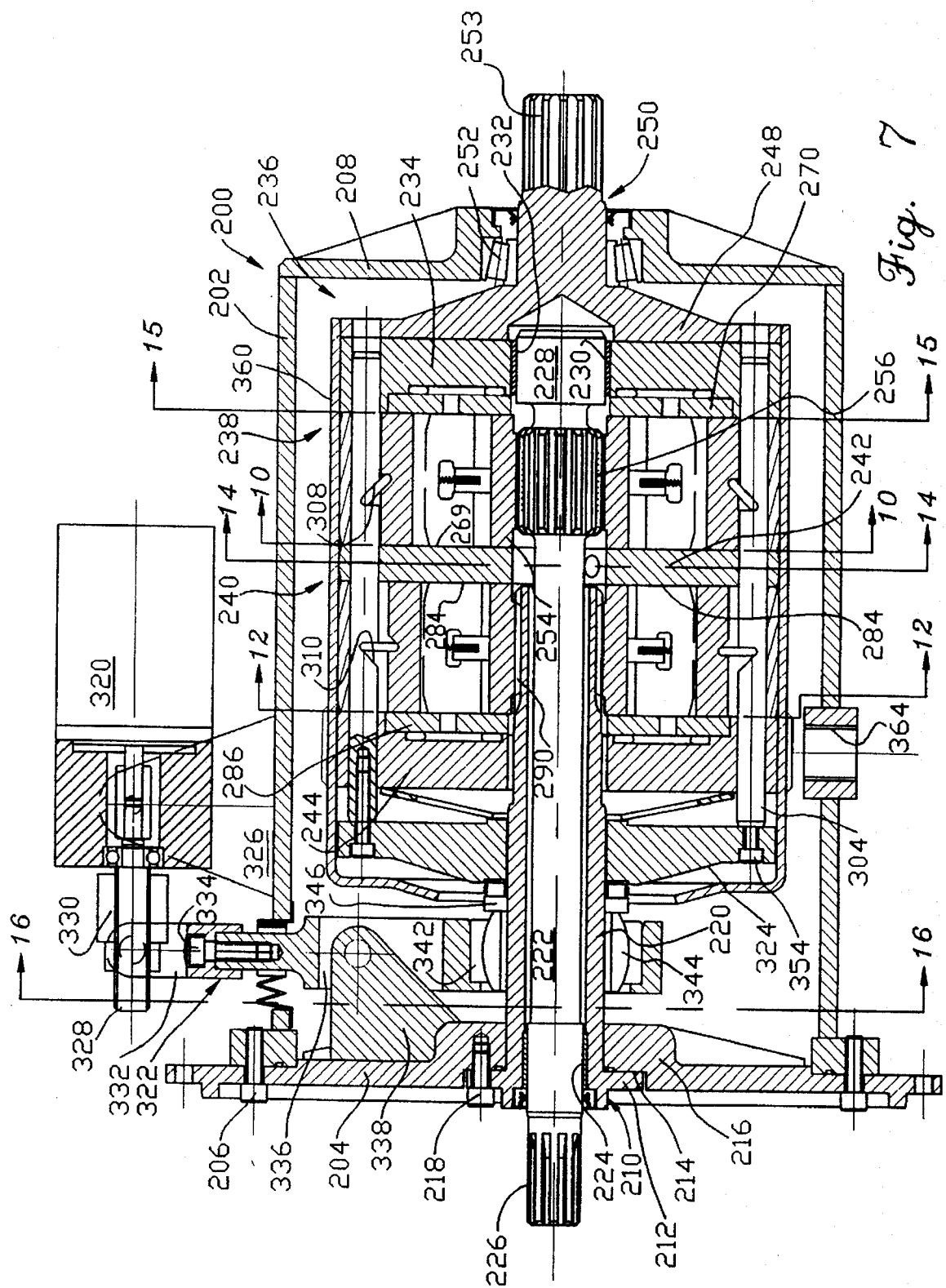
FIG. 7 is a side elevation of a second embodiment of a tandem vane-type transmission, shown adjusted to its neutral position.
Figure 8:
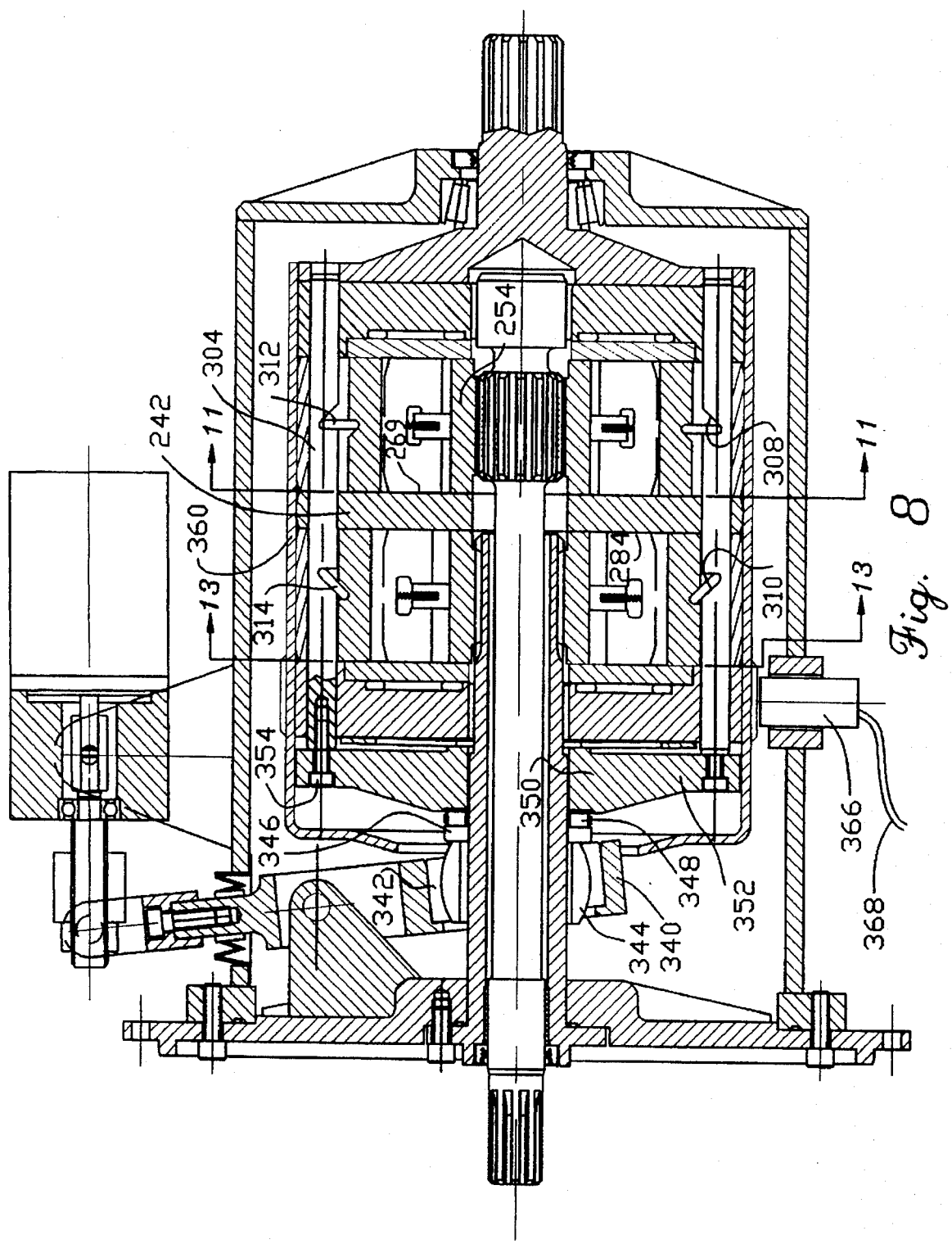
FIG. 8 is a side elevation of the transmission shown in FIG. 7, shown adjusted to its 1:1 transmission ratio position.
Figure 9:
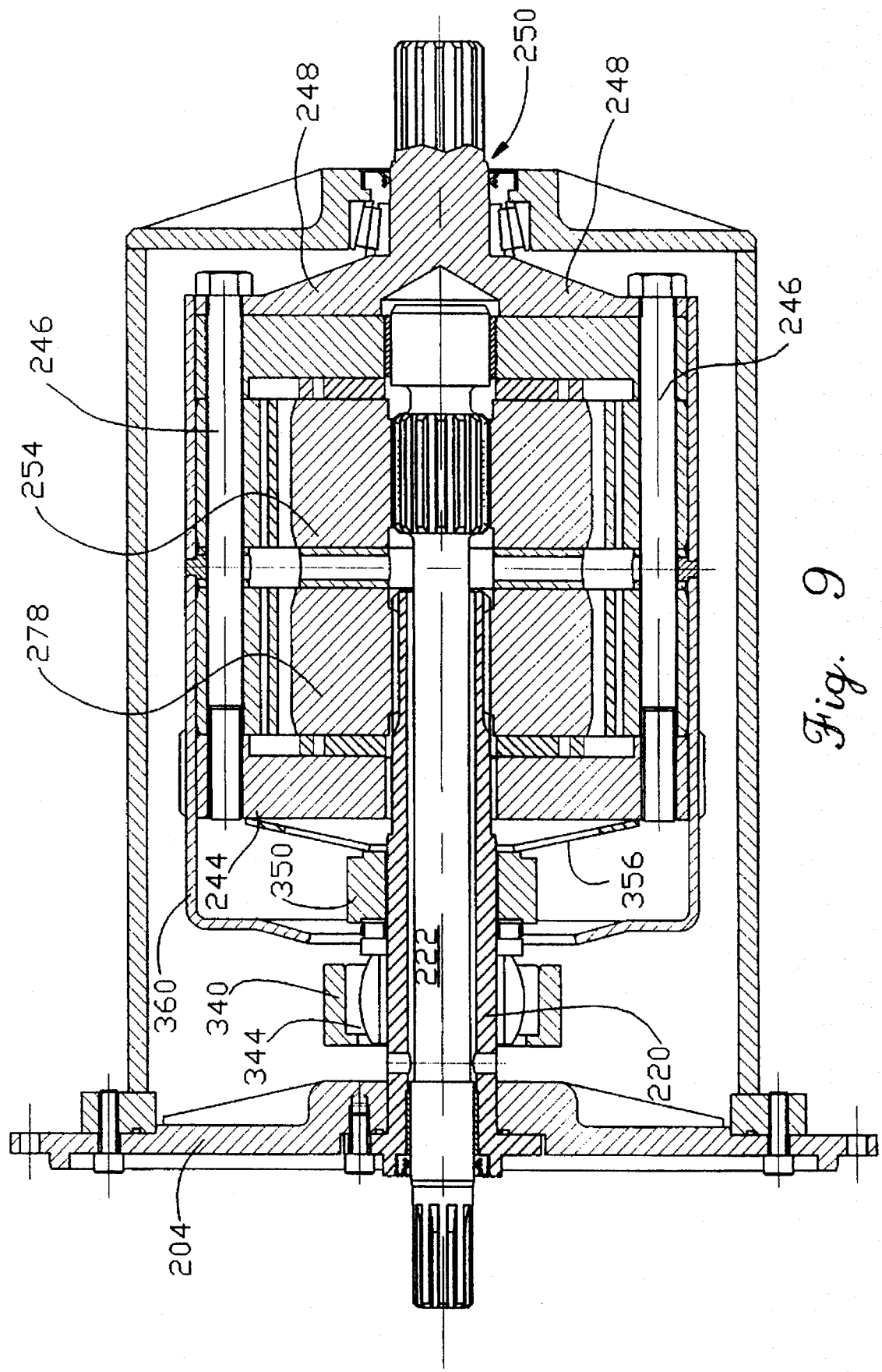
FIG. 9 is an elevation along lines 9–9 in FIG. 11.
Figure 10:
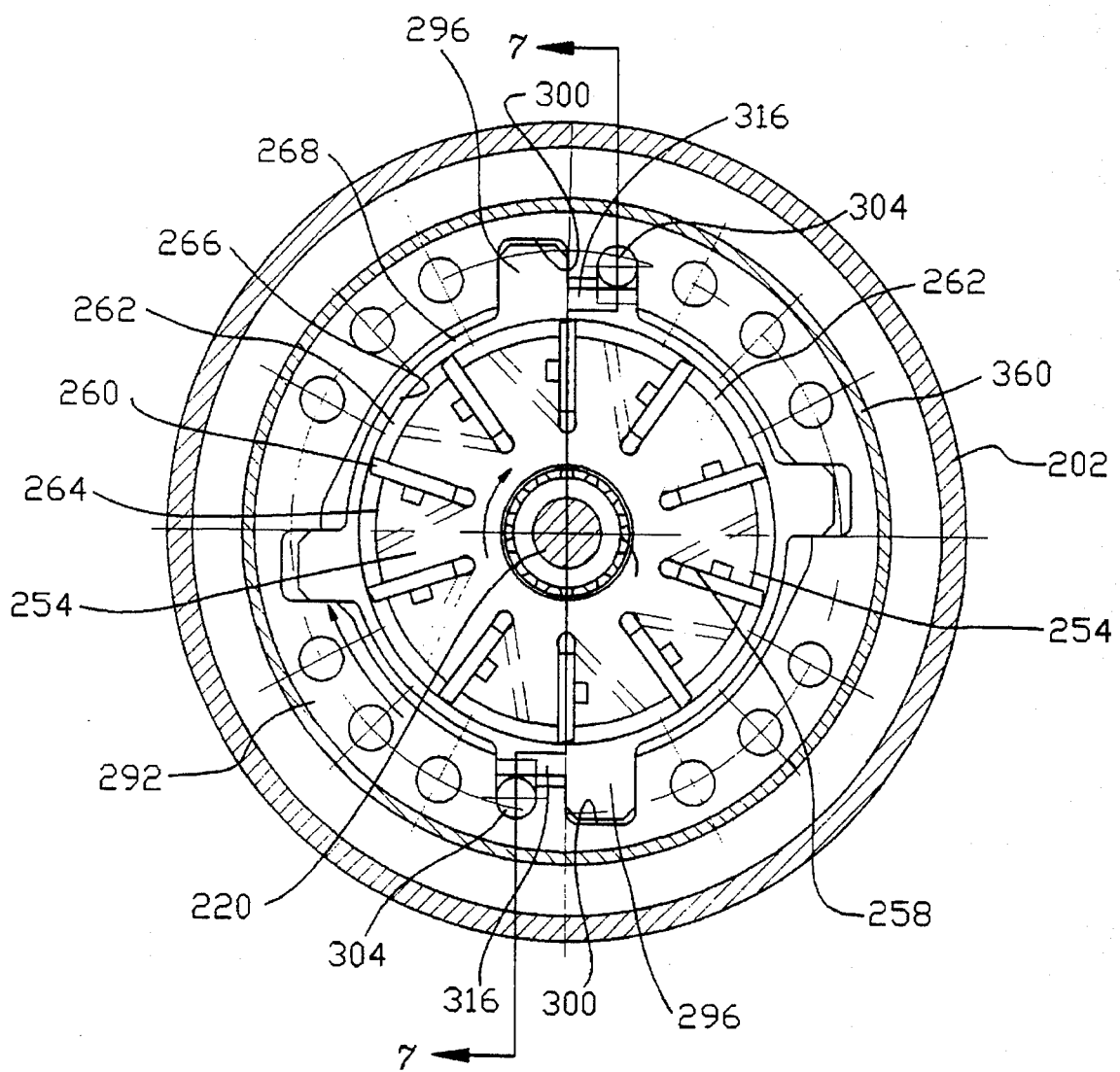
FIG. 10 is a sectional elevation of the transmission shown in FIG. 7 along lines 10—10 in FIG. 7.
Figure 11:
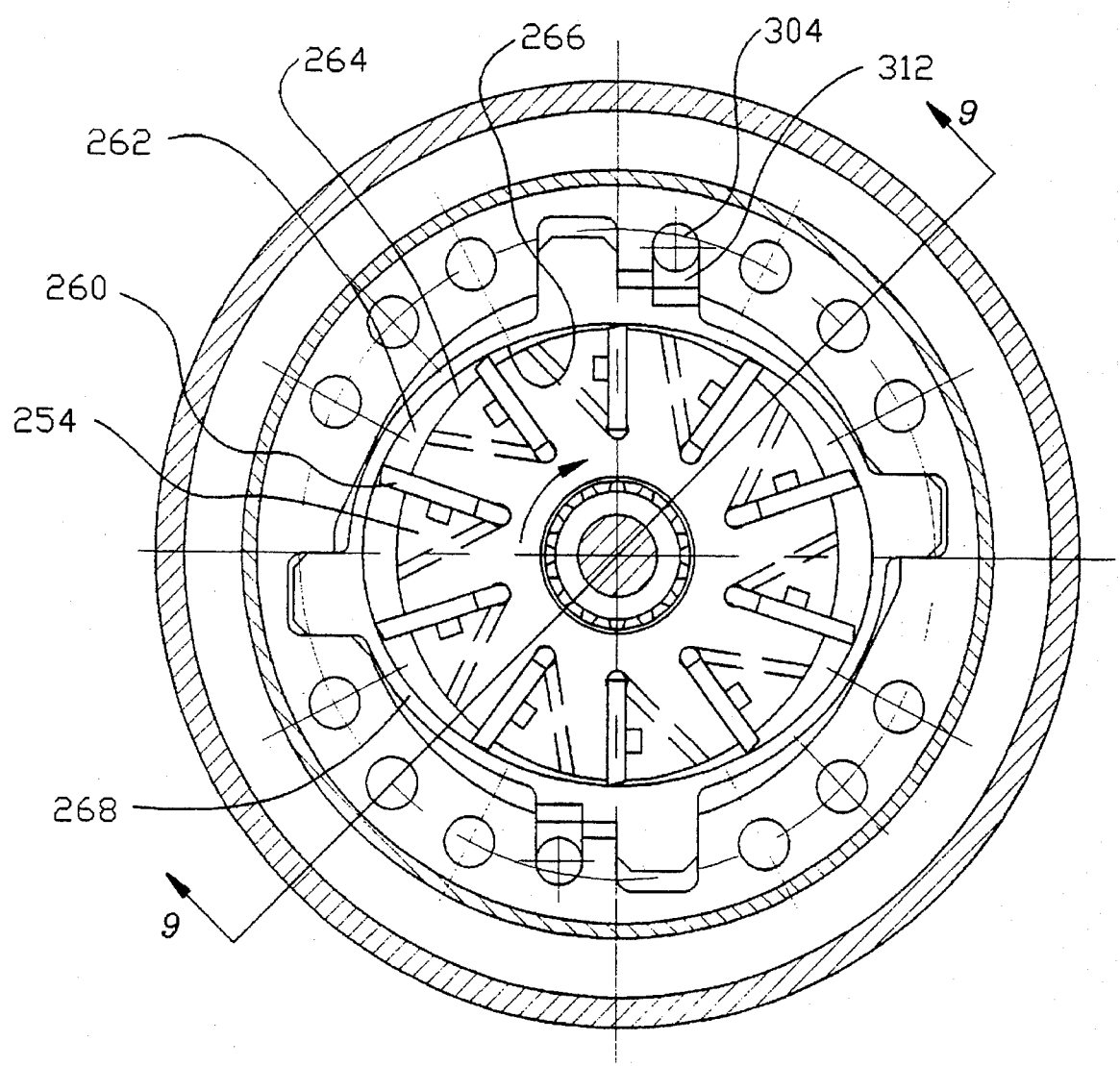
FIG. 11 is a sectional elevation of the transmission shown in FIG. 7 along lines 11—11 in FIG. 8.
Figure 12:
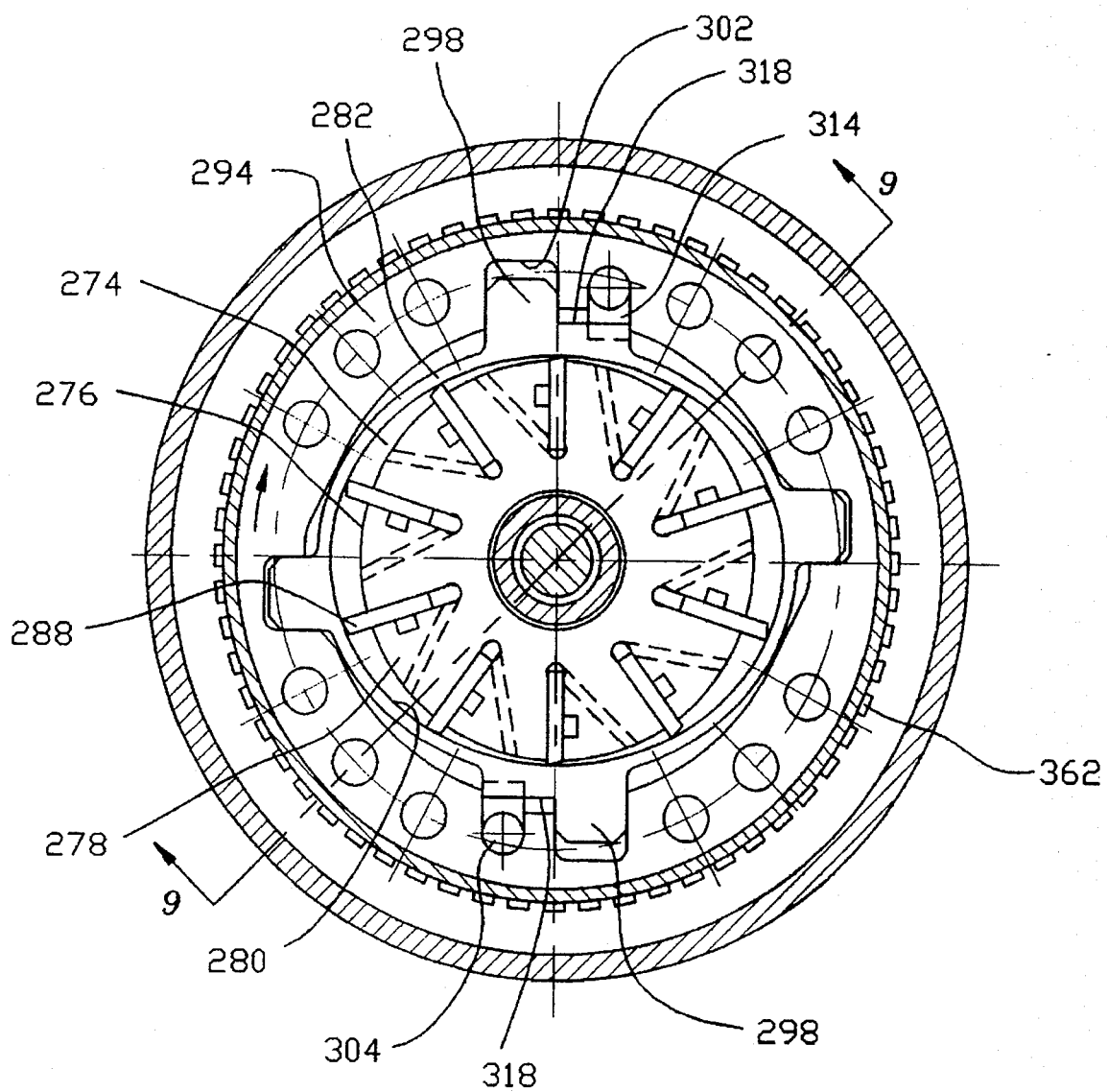
FIG. 12 is a sectional elevation of the transmission shown in FIG. 7 along lines 12—12 in FIG. 7.
Figure 13:
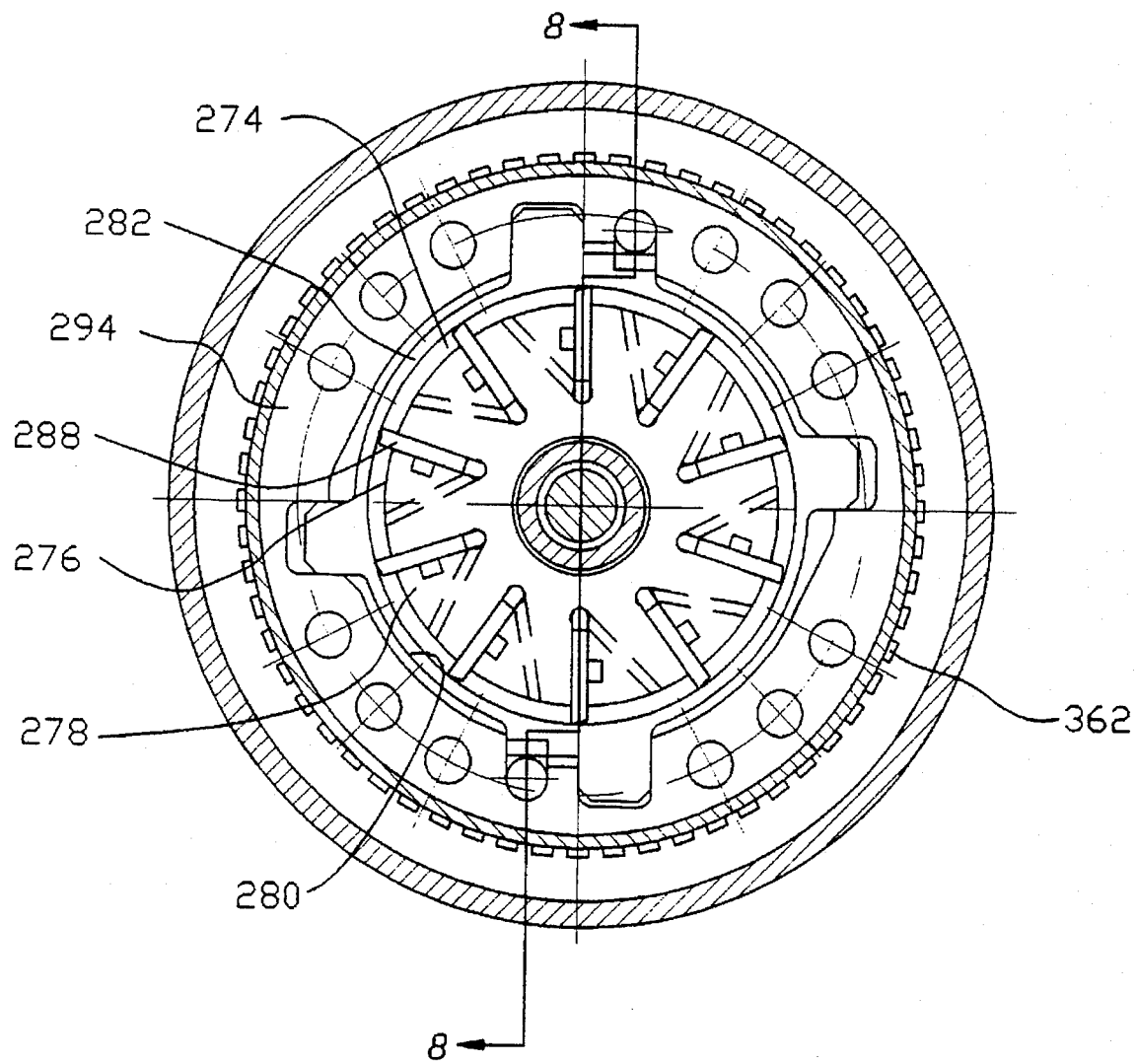
FIG. 13 is a sectional elevation of the transmission shown in FIG. 7 along lines 13—13 in FIG. 8.
Figure 14:
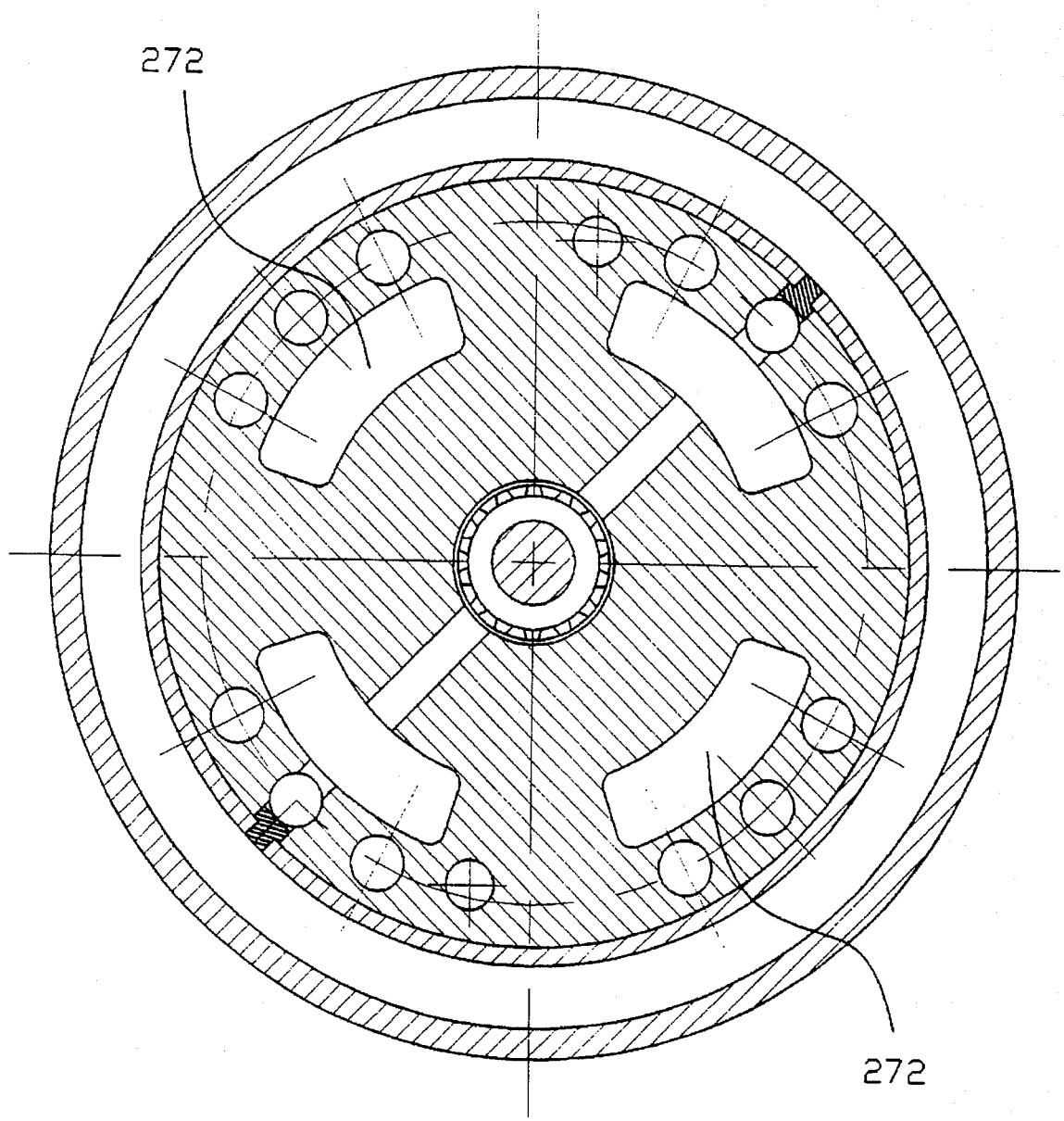
FIG. 14 is a sectional elevation of the transmission shown in FIG. 7 along lines 14—14 in FIG. 7.
Figure 15:
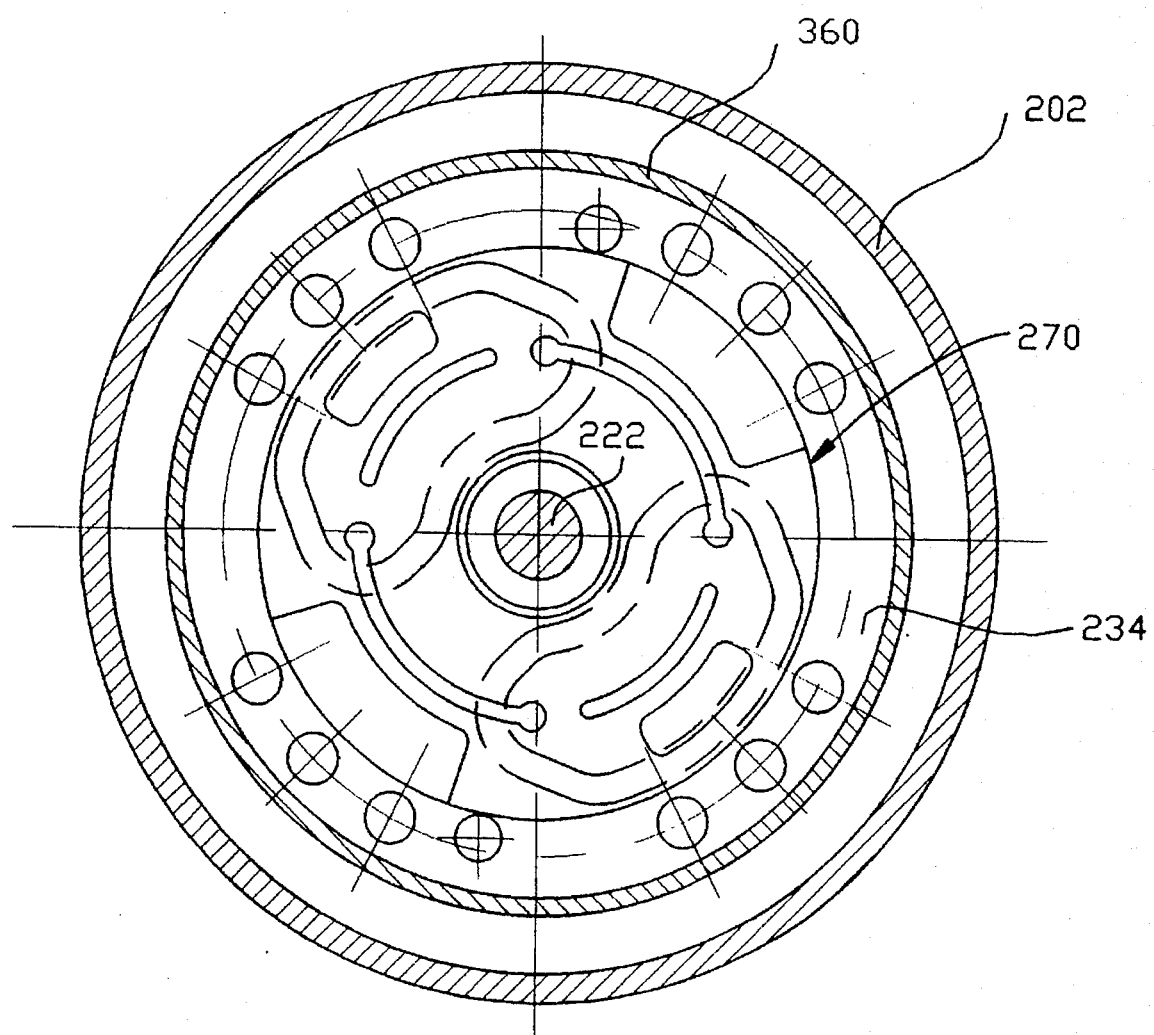
FIG. 15 is a sectional elevation of the transmission shown in FIG. 7 along lines 15—15 in FIG. 7.
Figure 16:
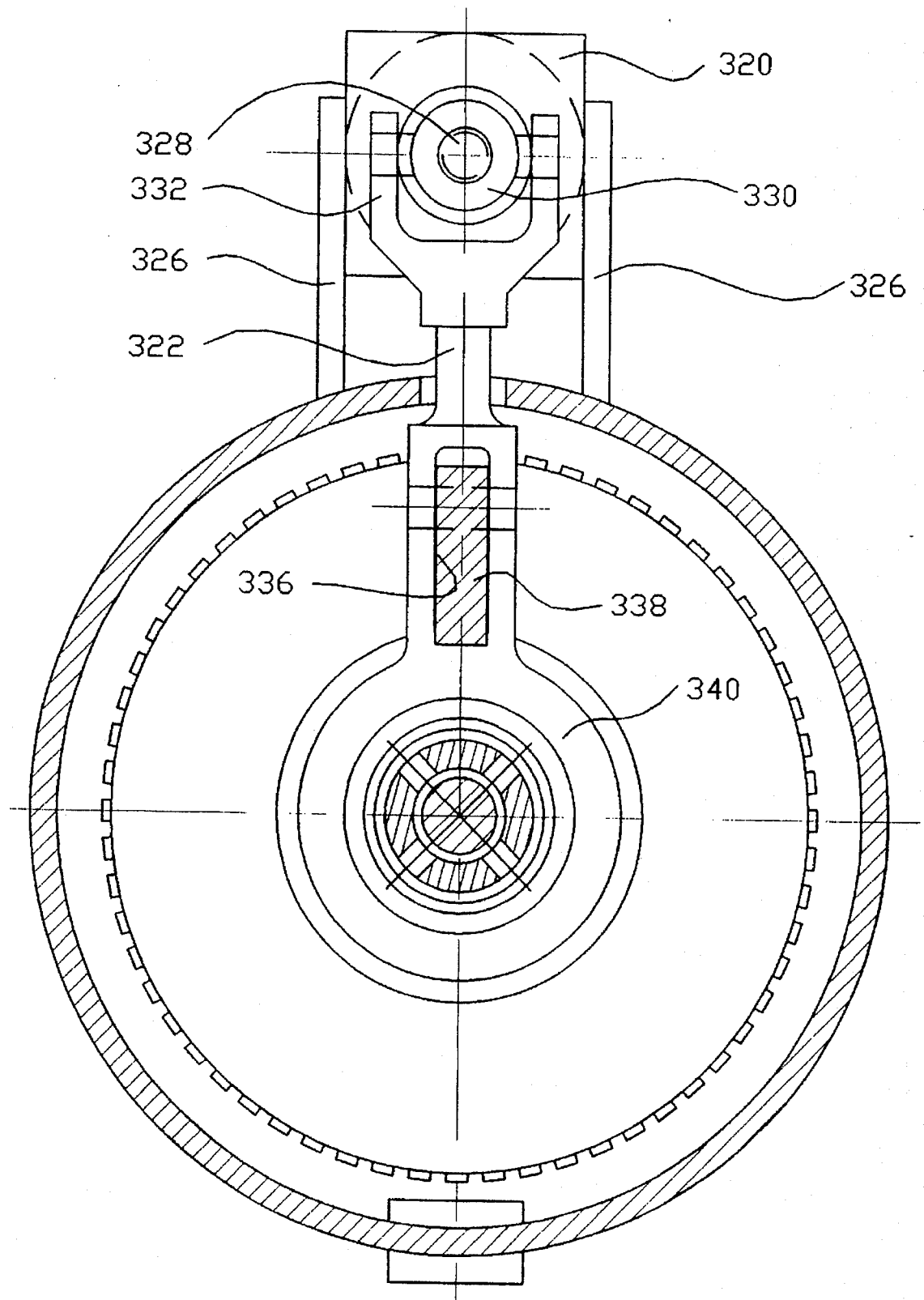
FIG. 16 is a sectional elevation of the transmission shown in FIG. 7 along lines 16—16 in FIG. 7.

The control lever 322, shown in FIGS. 7, 8 and 16 has a central slot 336 which receives and is pinned for swiveling movement through a vertical arc to a bracket 338 attached to the inside of the mounting flange 204. The lower end of the control lever 322 is formed in a ring 340 that holds a spherical bearing race 342, in turn engaged with a spherical bearing 344 slidably mounted on the tubular extension 220 of the ground shaft 210. The spherical bearing 344 engages an annular disc 346 in contact with a roller bearing 348 surrounding the ground shaft tubular extension 220 and in rolling contact with the spider 324 which rotates with the rotating assembly 236.

The spider 324 includes a hub 350 surrounding the tubular extension 220 of the ground shaft 210, but spaced slightly therefrom to prevent contact between the rotating spider hub 350 and the stationary ground shaft. The spider has two diametrically opposed radial arms 352 attached at their distal ends to the ends of the two control rods 304 by screws 354 threaded into tapped axial holes in the end of the two rods 304. A conical spring 356 having radial fingers 358 extending inwardly from an outer ring and bearing at their ends against the inside face of the hub biases the spider toward the input end and maintains contact between the roller bearing 346, the disc 342, and the spherical bearing 344.

A shroud 360 encloses the rotating assembly 236 to present a smooth surface to the body of hydraulic fluid within the housing 200 to minimize churning the hydraulic fluid, particularly by the spider arms 324. The shroud has a circumferential ring of closely spaced shallow teeth 362, positioned around the circumference of the shroud 360 at an axial position therealong aligned with a port 364 through the body 202 of the housing 200. A sensor such as a proximity sensor 366 is mounted in the port in close proximity to the ring or teeth and detects the passage each tooth 362 past the sensor. The sensor output is conducted to the control system 306 via leads 368 where it is converted by a processor 370 into rotational speed. The rotational speed is compared in a comparitor 372 to the desired set speed and, in the event of a deviation, the comparitor generates an error signal which is transmitted to the servo motor as correction signal to readjust the tilt angle of the control lever 322. An interrogation of the sensor 366 by the processor 370 is initiated periodically, for example, 10 times per second, so the transmission is continually adjusted if necessary to maintain the desired speed instruction input to the control system 306.

The Third Embodiment

Figure 17:
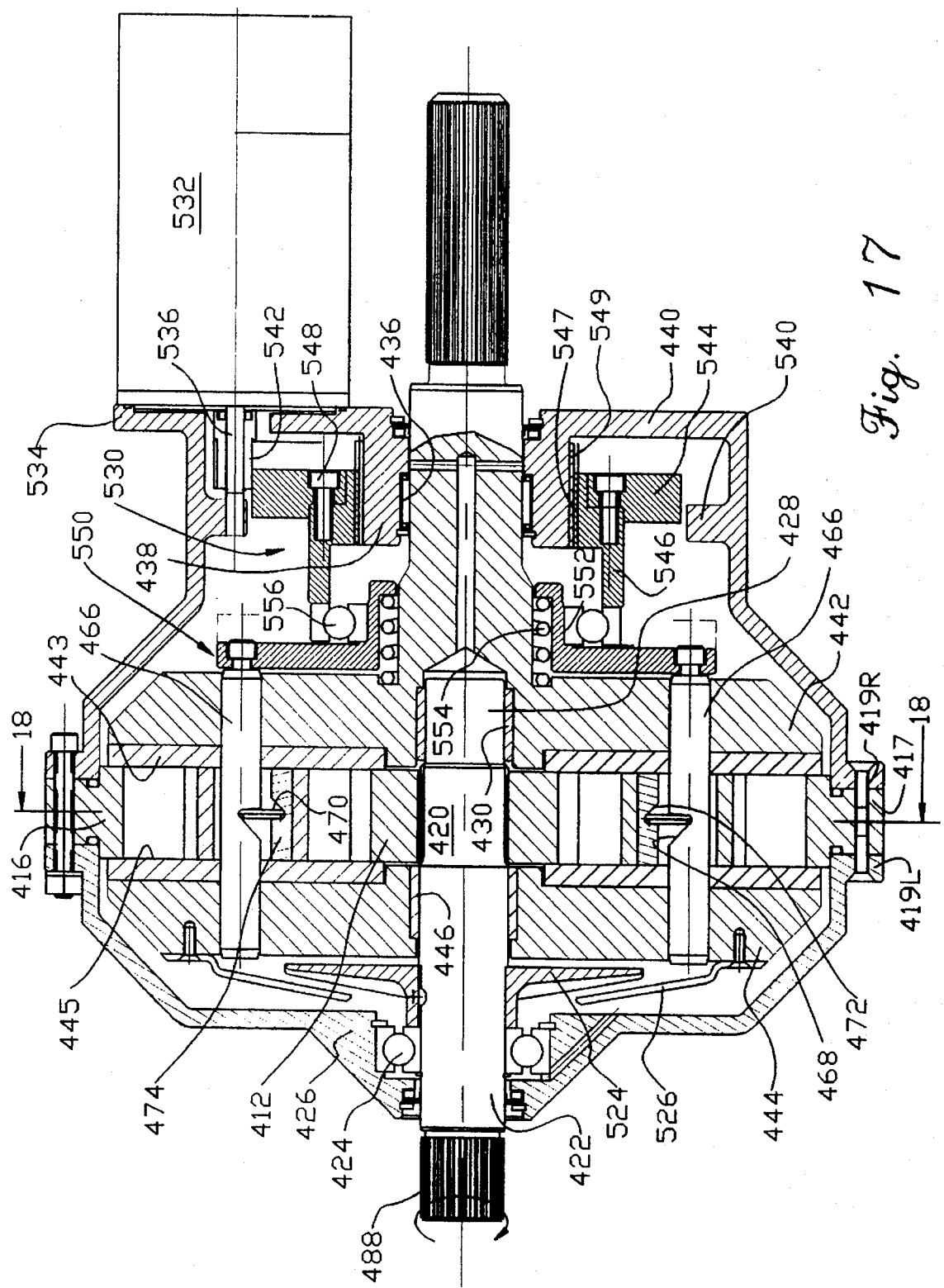
FIG. 17 is a sectional elevation of a third embodiment of the inventive transmission having vane type pump and stator units arranged concentrically.
Figure 18:
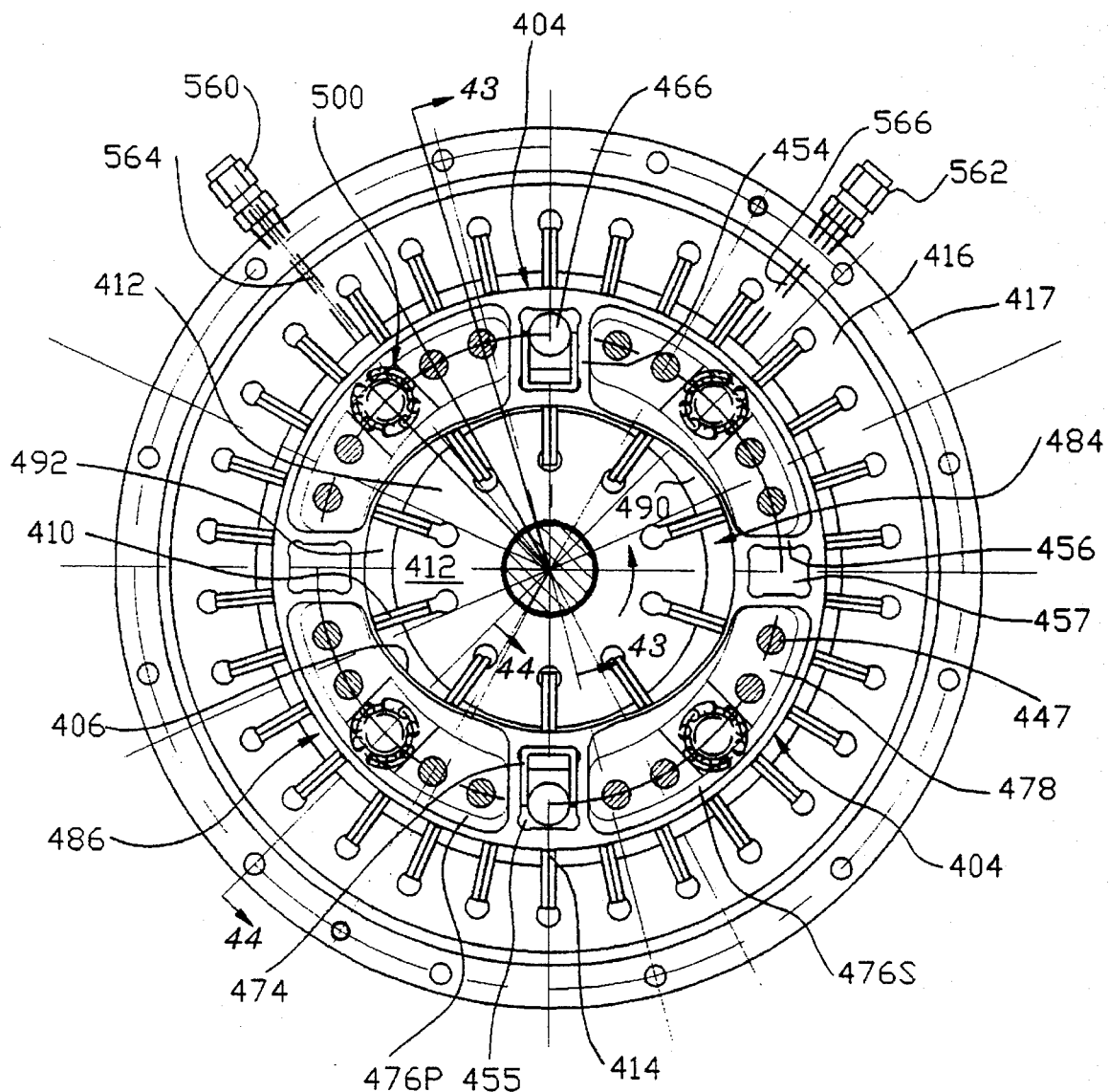
FIG. 18 is a sectional elevation of the concentrically designed vane-type transmission shown in FIG. 17 along lines 8—8 in FIG. 17
Figure 18A:
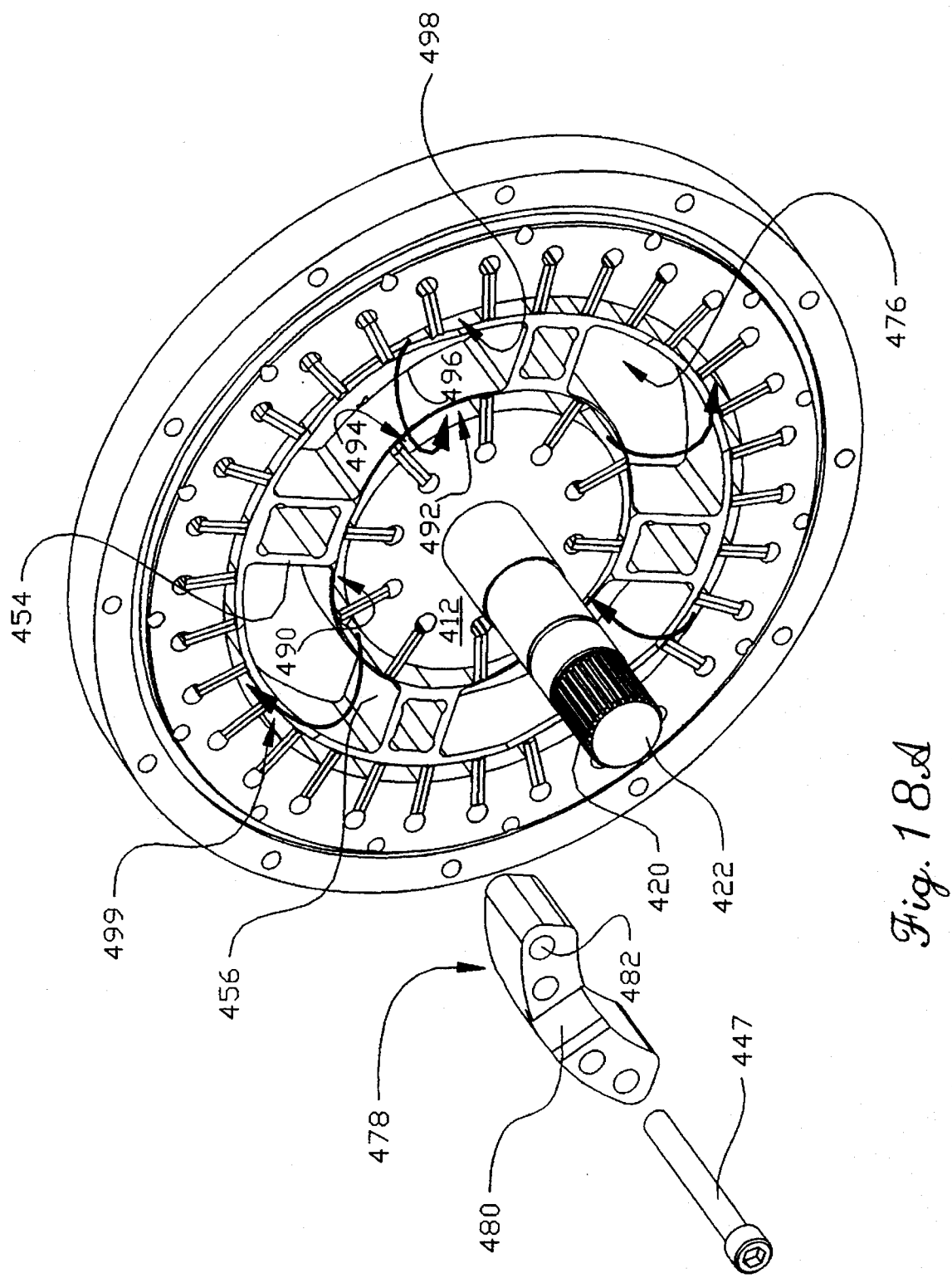
FIG. 18A is a sectional perspective view of the concentrically designed vane-type transmission shown in FIG. 17 showing the fluid flow path into and out of the pump and stator chambers.
Figure 26:
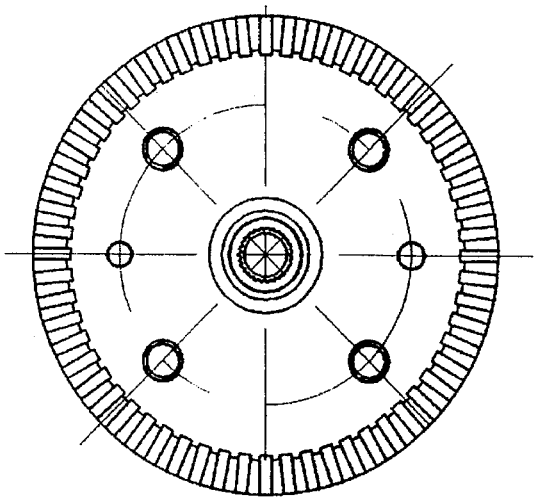
FIG. 26 is an end elevation of the output shaft of the embodiment shown in FIG. 17 along lines 26—26 in FIG. 25.
Figure 25:
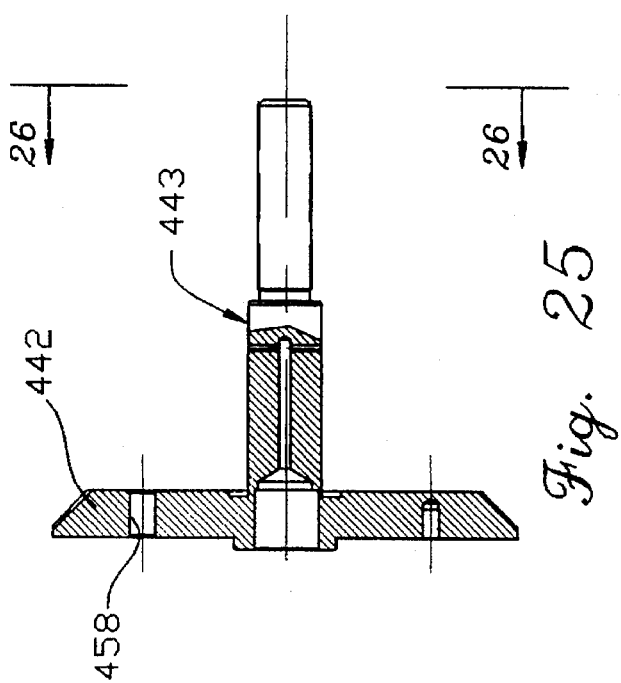
FIG. 25 is a sectional side elevation of the output shaft in the embodiment of FIG. 17, along lines 25—25 in FIG. 24.
Figure 27:
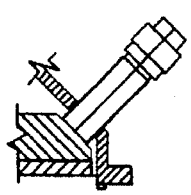
FIG. 27 is a side elevation of a speed sensor mounted in the housing adjacent the output shaft end plate shown in FIG. 25.
Figure 24:
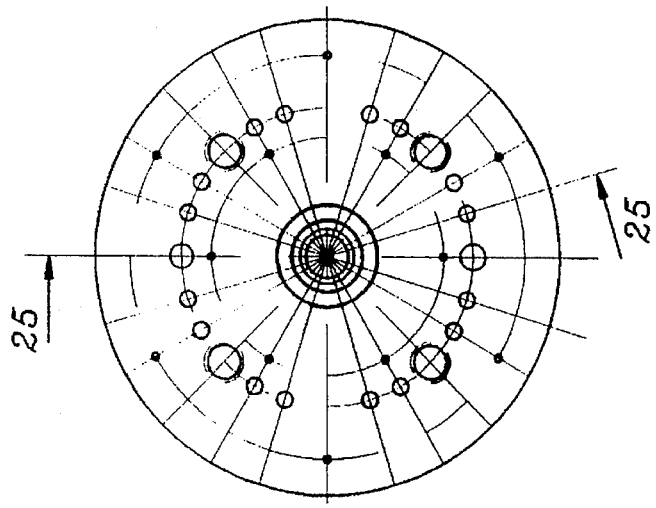
FIG. 24 is an end elevation of the inside face of the end plate on the output shaft of the embodiment shown in FIG. 17.
Figure 31:
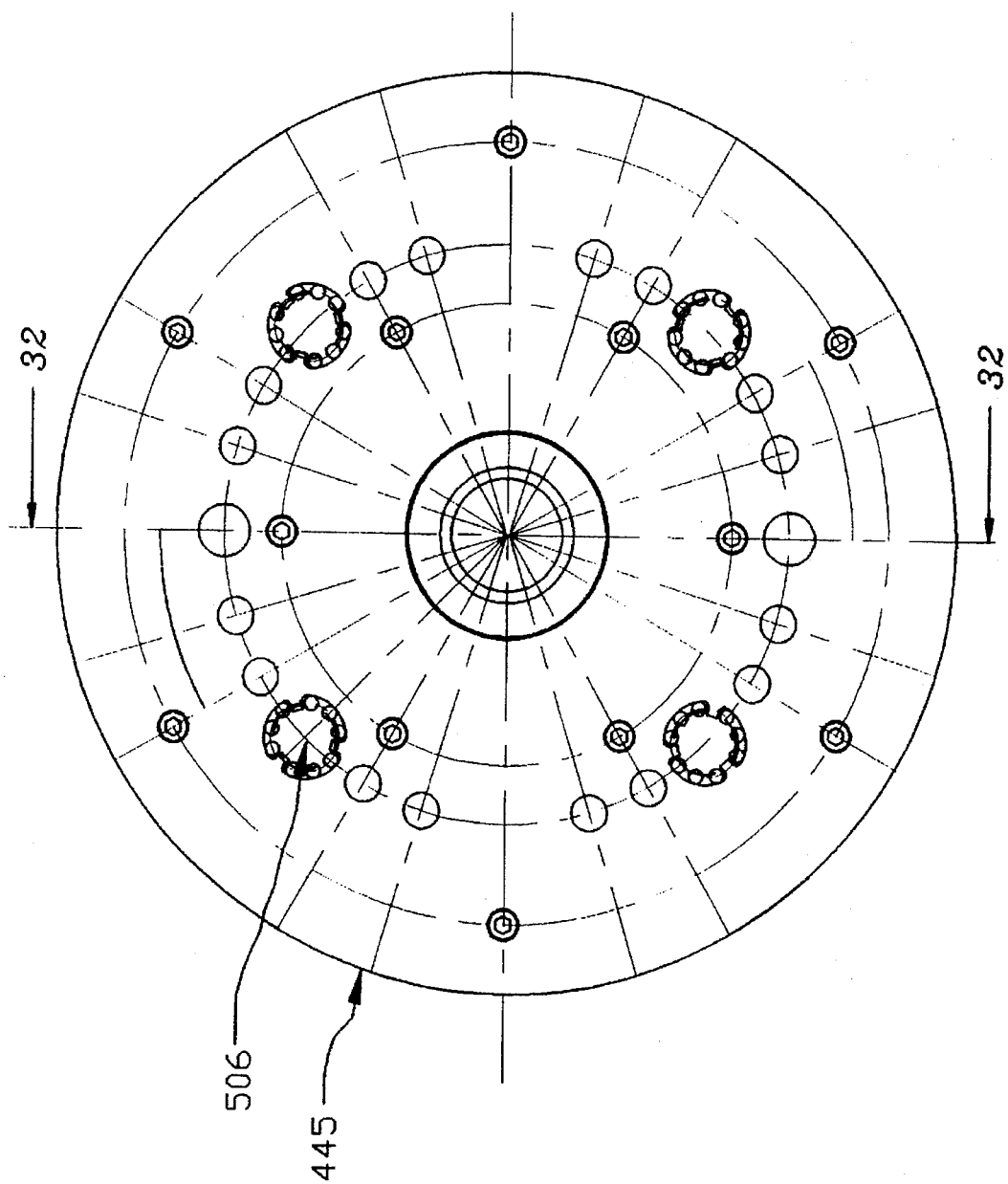
FIG. 31 is an end elevation of the input-side end plate shown in FIG. 28, with the wear plate attached.
Figure 32:
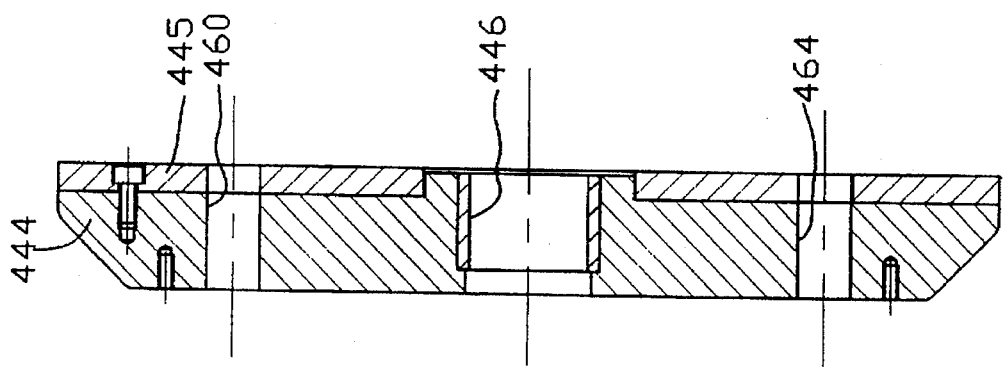
FIG. 32 is a sectional elevation along lines 32—32 in FIG. 31.

A third embodiment of the invention, shown in FIGS. 17–18, utilizes a vane-type pump unit 400 and a surrounding concentric vane-type stator unit 402. A unitary cam ring 404 for both pump and stator units has inner and outer cam surfaces 406 and 408 in contact with the free ends of outwardly extending vanes 410 carried by a pump rotor 412 of the pump, and the free ends of inwardly extending vanes 414 carried by a surrounding hub 416 of the stator 402. The stator hub has a radial flange 417 bolted between two facing radial flanges 419L and 419R of two mating halves of an enclosing housing 418, shown in FIGS. 19–21.

The pump rotor 412 is splined to and driven by an inner splined section 420 of an input shaft 422, which in turn is journaled for rotation in the housing 418 in a bearing 424 mounted in a recess on an axial boss 426 on the housing 418. The inner end 428 of the input shaft 422 is journaled in a journal bearing 430 pressed into an axial bore in an inner face 432 of an output shaft 434, as shown in FIGS. 22–27. The output shaft 434 in turn is rotatably supported in a roller bearing 436 mounted in an axial bore 437 through an inwardly projecting nipple 438 on an inner surface of a flat output end wall 440 of the housing 418.

The inner end of the output shaft 434 is radially enlarged to form an end plate 442 which is axially spaced from a similar input-side end plate 444, shown in FIGS. 28–32. The end plates 442 and 444 each have a wear plate 443 and 445, respectively, fastened to the axially inwardly facing surfaces of the end plates. The input-side end plate 444 is journaled for rotation on the input shaft 422 on a journal bearing 446 pressed into an axial hole through the center of the plate 444. The end plates 442 and 444 bracket the pump unit 400, the stator unit 402 and the cam ring 404 and are secured by sixteen bolts 447 to contain and react the outward axial forces exerted by the pressurized fluid in the pump and stator working volumes.

The pump rotor 412 has ten radial slots 446 for receiving the vanes 410 which, in this third embodiment, are double vanes that can exert/receive pressure on/from both sides of the vanes 410, for purposes of regenerative braking and engine starting, as described below. The vanes 410 are biased outward into contact with the cam ring inner surface 406 by centrifugal force and hydraulic pressure, and move radially in the slots 446 as the pump rotor turns relative to the cam ring 404 to follow the contour of the inner surface 406. Likewise, the stator hub 416 has radial slots 448 which receive thirty stator vanes 414 biased radially inward against the outer surface 408 of the cam ring 404 by springs and hydraulic pressure.

The cam ring 404, shown in detail in FIGS. 33–38, is an annular double-wall construction having an inner wall 450 and an outer wall 452 coupled at four equally spaced circumferential positions by top and bottom webs 454, and two side webs 456. Each of the top and bottom webs 454 has a central axial opening 455 therethrough, and each side web 456 has an axial opening 457 therethrough. The radial dimension of the webs 454 is slightly greater than the radial dimension of the webs 456, and the cam ring 404 is machined such that in the unstrained condition shown in FIG. 37, the inner wall 450 is circular while the outer wall 452 is elliptical in cross-section. In the strained condition, after deformation by the cam-operated toggles 470 to be described below, the inner wall 450 is elliptical and the outer wall 452 is circular in cross-section.

The opening 455T through the top web 454 is aligned with axial holes 458 and 460 through the end plates 442 and 444, and the opening 455B through the bottom web 454 is axially aligned with aligned axial holes 462 and 464 through the end plates 442 and 444. The aligned axial holes 458 and 460, and the opening in the top web 454T receives a control rod 466T, shown in detail in FIGS. 39 and 40, and the aligned axial holes 462 and 464 through the end plates 442 and 444 and the opening through the bottom web 454B receives a control rod 466B.

Figure 40:
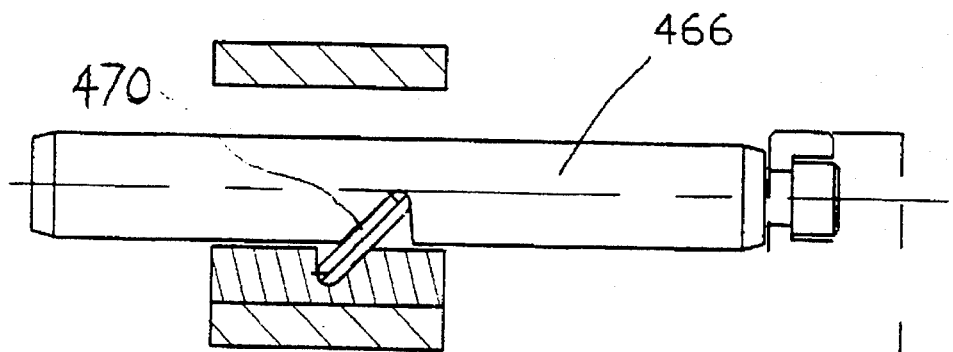
FIGS. 39 and 40 are side elevations of the top control rod in the 1:1 and neutral positions, respectively.
Figure 39:
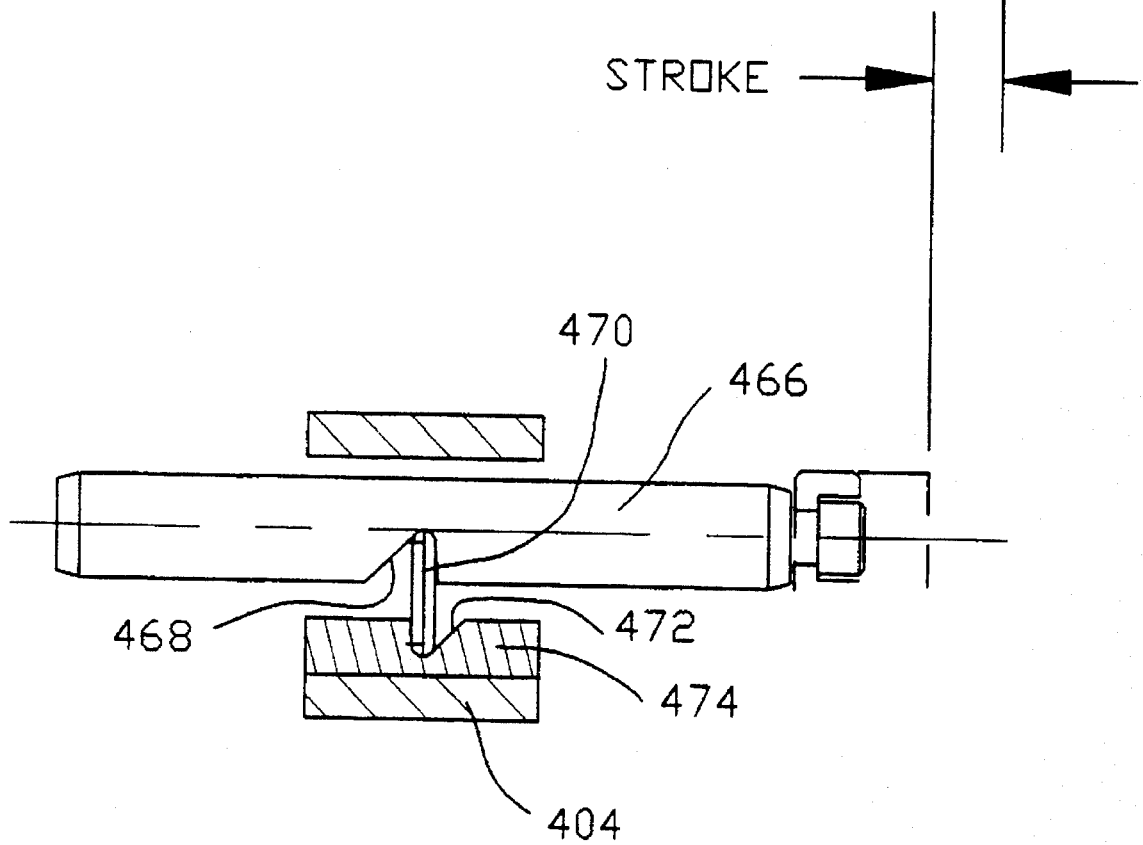

The control rods 466T and 466B each have a single notch 468 sloping to the left as shown in FIGS. 1 and 39–40. Each notch 468 receives one end of a toggle 470, the other end of which is received in a right-sloping notch 472 in a U-shaped insert 474 seated in the top and bottom openings 455T and 455B. Axial movement of the control rods 466 toward the end wall 440, that is, toward the right in FIG. 1 from the position shown therein, causes the toggles 470 to tilt over toward the left in each notch 468 in the control rods 466T and 466B, allowing the cam ring 404 to relax from its deformed cross-section shown in FIG. 38 to one closer to the relaxed cross-section shown in FIGS. 33 and 37. Conversely, axial movement of the control rods 466 toward the input side, that is, toward the left in FIG. 17, tilts the toggles 470 in the notches 468 and 472 toward a more vertical position, exerting a radial force on the cam ring 404 to deform it toward a cross-section like that shown in FIG. 38. The most extreme deformation of the cam ring 404 caused by movement of the control rods straightening the toggles 470 to the radial position shown in FIGS. 17, 38 and 39 is still within the elastic limit of the material of the cam ring 404, so that when the control rods 466 move back toward the output side and tilt the toggles 470 back toward the right in FIG. 17, the restoring force or springback of the cam ring material will cause it to relax toward its cross-section shown in FIG. 37.

Figures 41, 42:
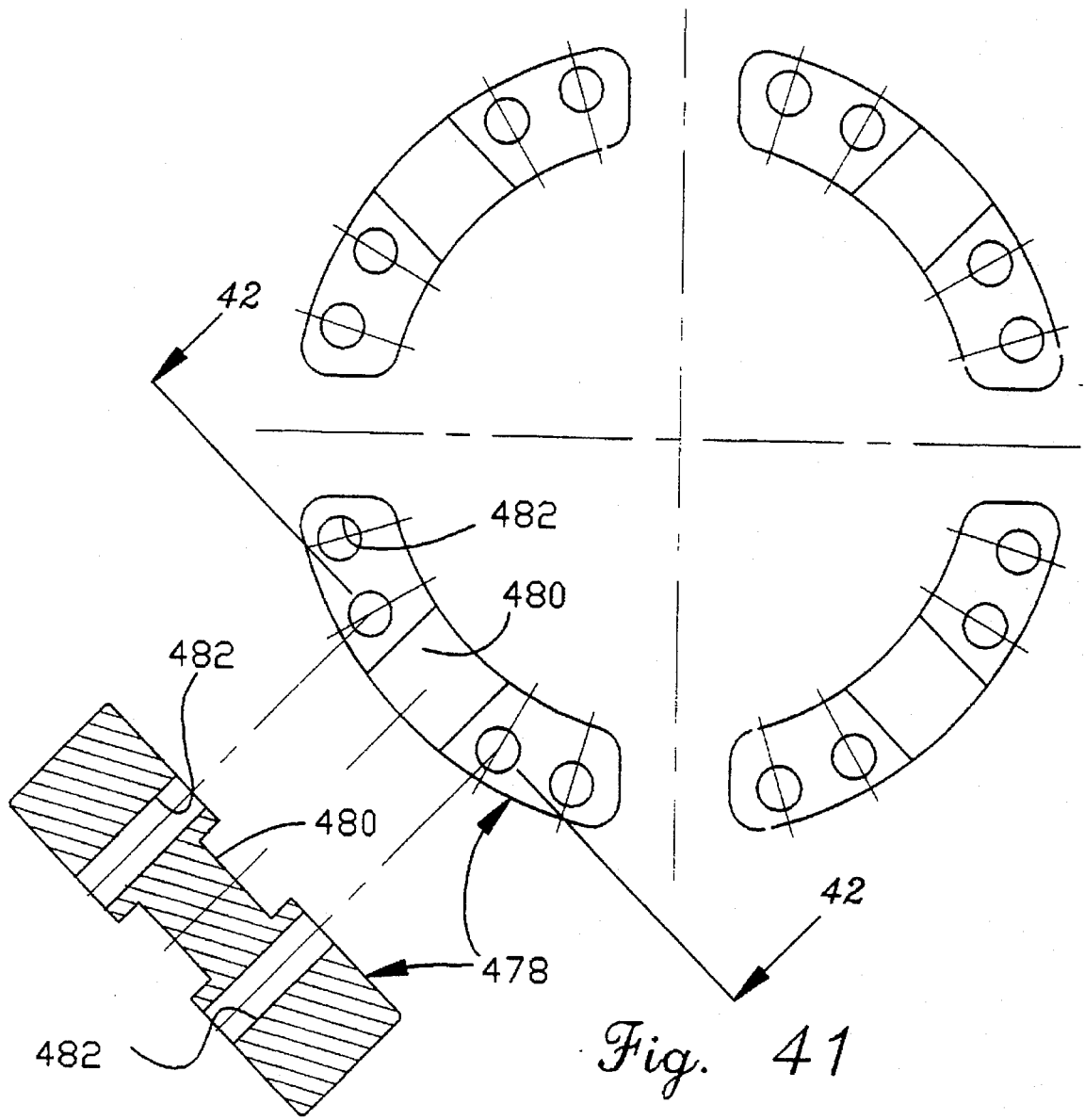
FIG. 41 is a side elevation of an array of torque arms used in the embodiment shown in FIG. 17.
FIG. 42 is a view along lines 42—42 in FIG. 41.
Figure 43:
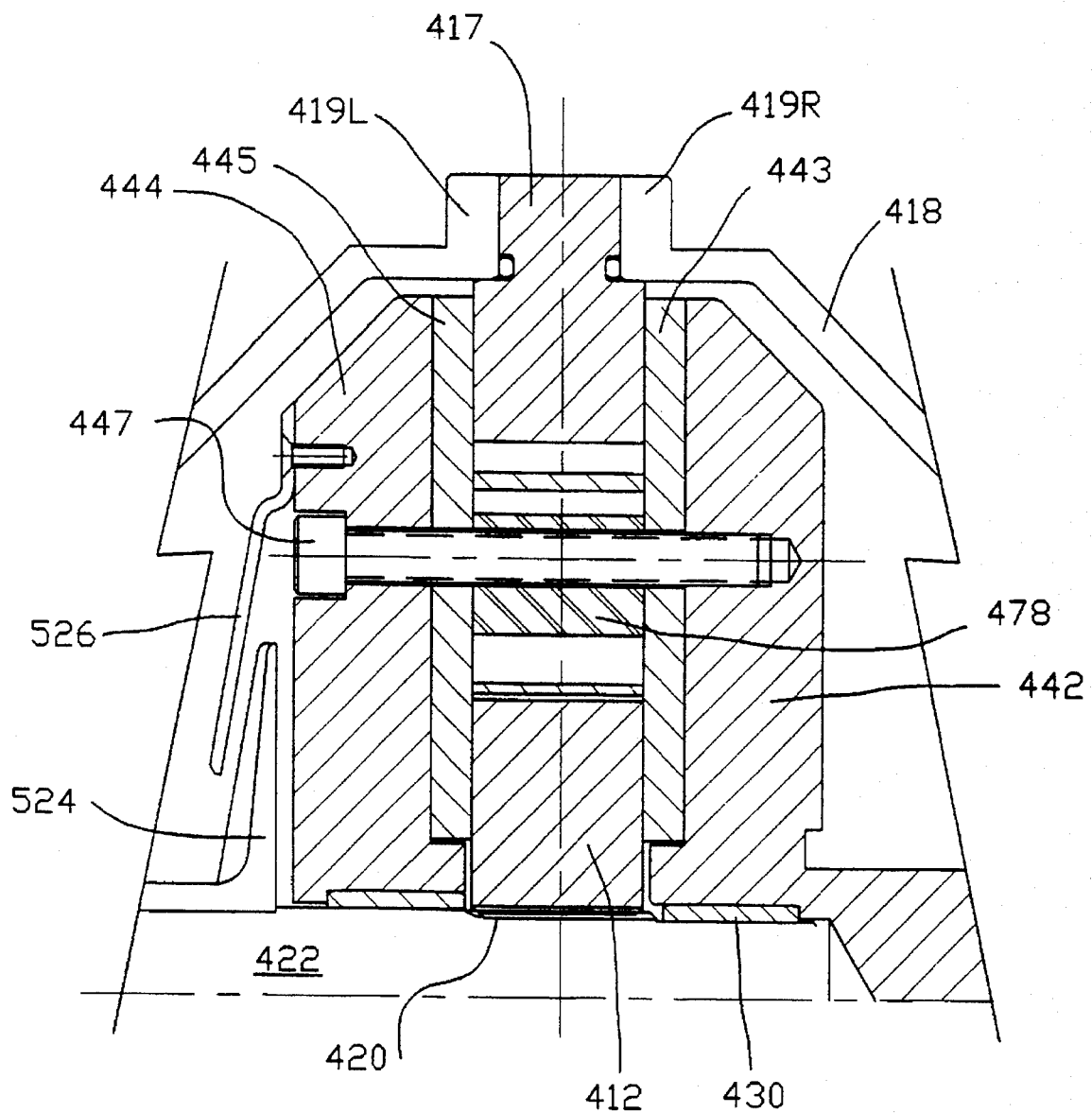
FIG. 43 is a partial sectional elevation through the torque arm along the lines 43—43 in FIG. 18.

The cam ring 404 has four arcuate compartments 476 defined as the space between the cam ring inner and outer walls 450 and 452, and between adjacent webs 454 and 456. The compartments 476 each receive a torque arm 478, shown in FIGS. 41 and 42, for transferring torque from the cam ring to the output shaft 434. All four torque arms 478 are identical, so description of one will describe them all. Each torque arm is an arcuate sector of an annular circular ring of rectangular cross-section. A shallow channel 480 is machined radially across each axial face at the angular midpoint, and four axially extending holes 482 are drilled through the torque arm, two each equally spaced on each side of the channel 480, for receiving the bolts 447, as shown in FIG. 43. The axial thickness of the torque arms 478 is slightly greater than the axial thickness of the cam ring 404 to leave a slight clearance between the wear plates 443/445 and the cam ring 404 to permit the cam ring 404 to be flexed radially by the control rods 466 and their toggles 470 without interference with the wear plates even though the bolts 447 are torqued down hard to exert a strong inward axial force on the end plates 442 and 444 and their wear plates 443 and 445 to resist the outward pressure force of the pressurized hydraulic fluid in the working volumes 484 and 486 of the pump and stator units 400 and 402, respectively.

Rotation of the input shaft 422, usually by torque input from the output shaft 27 of a prime mover 28 to an input torque coupling 488 at the input end of the input shaft 422 drives the pump rotor 412 by way of the splined section 420 of the input shaft 422, in turn driving the pump vanes 410 around the pump working volume 484. As shown in FIG. 18, the pump working volume, defined radially between the external cylindrical surface of the pump rotor 412 and the inner cam surface 406, and axially between the wear plates 443 and 445, is, in the 1:1 position illustrated in FIG. 18, a flattened two-lobed annular form that is thickest on its longest axis and tapering to zero thickness at its shortest axis. The inner surface of the pump working volume 484 is cylindrical, since it is defined by the cylindrical surface of the pump rotor 412, and the outer surface (in the 1:1 configuration shown in FIG. 18) is elliptical, since the inner surface 406 of the cam ring 404 is elliptical in the deformed 1:1 configuration of the cam ring shown in FIGS. 18 and 38.

Rotation of the pump vanes 410 through the pump working volume 484 in this configuration pressurizes hydraulic fluid in the tapering sectors 490 which exerts a fluid force on the cam ring 404 that is transmitted through the torque arms 478 to the output shaft 434 as output torque. Rotation of the pump vanes through the flaring suction sectors 492 exerts a section to draw fluid into the suction sectors 492, as described below. As the pump vanes 410 rotate around the elliptical inner surface 406 of the cam ring 404, they slide radially in the pump rotor slots 446 and are biased outwardly by centrifugal force against the surface 406 to maintain contact and sweep the working volume to displace fluid therefrom or draw fluid into the suction sectors 492. Another conventional outward biasing force on the vanes 410 is exerted by fluid pressure delivered to an enlarged inner end of the slots 446 through an axial hole 490 drilled through the rotor 412 at the bottom of each slot and communicating with a source of fluid pressure through an arcuate slot (not shown) in one or both of the wear plates 443 and 445 aligned with the axial hole 490.

The fluid pressurized in the pressurizing sectors 490 of the pump working volume 484 acts against the effective radial area of the cam ring 404, to produce torque in the output shaft 434. The effective area of the cam ring 404 against which the fluid pressure acts to produce output torque is equal the area of the radial face of the web 454 in the compartments 476P, less the radial area of the webs 456 in the compartments 476P. Since there are two pairs of webs 454 and 456, the total pressure force exerted is actually a couple exerted at the radius of the center of pressure of the web faces. The pressure force exerted on the cam is equal to the product of the effective cam surface area and the system pressure $P_s$. The torque applied to the output shaft is equal to double the product of the pressure force and the moment arm, which is the length of the radius from the axis of the output shaft to the center of pressure on the web faces. The total output torque is reduced by the pressure force exerted by the fluid pressure in the cam ring compartments 476S radially aligned with the suction sectors 492 of the pump working volume 484. However, since the pressure in the compartments 476S is at the suction pressure, the opposing torque generated by the fluid in the compartments 476S is at suction pressure, the torque is negligible.

Starting the driven apparatus, e.g. a motor vehicle or machine tool, from standstill, the transmission is in the neutral position illustrated in FIGS. 33, 37 and 40. In the neutral position, the control rods 466 are in their right-most position, at the opposite extreme from that shown in FIG. 17, closest to the output-end wall 440, which orients the toggles 470 at a tilted position in the notches, lying at about 45° to the axis of the control rods, as shown in FIG. 40. The vertical foreshortening of the toggles at the 45° position permits the cam ring 404 to spring back to its undeformed position wherein the cross-section of the inner wall 450 of the cam ring is circular and the cross-section of the outer wall 452 is elliptical, as illustrated in FIG. 37. In the relaxed or undeformed position of the cam ring 404, the pump working volume 484 is perfectly cylindrical at both radial surfaces, so rotation of the pump vanes 410 through the working volume 484 merely rotates a cylindrical body of fluid between the vanes 410 around the pump working volume within the circular cross-section cam ring inner surface 406, displacing no fluid out of the working volume 484 and pressurizing no fluid in any sector of the working volume. Hence, in this position of the cam ring 404, no circumferential force is exerted on the cam ring (discounting the small friction force of the vanes on the cam ring and wear plates 443 and 445) so no (or negligible) torque is transmitted to the output shaft 434, hence the "neutral" designation.

To begin applying power to the output shaft 434, the transmission ratio is adjusted smoothly and continuously from neutral toward a high transmission ratio near neutral by moving the control rods toward the input side, away from the output-end wall 440, using a rod positioning mechanism described below. Movement of the control rods 466 tilts the toggles 470 slightly between the notches 468 in the control rods 466 and the notches 472 in the U-shaped insert 474, exerting an inward radial force on the top and bottom webs 454 to deform the cam ring slightly to change the inner wall 450 of the cam ring from a circular cross-section shown in FIGS. 33 and 37 to a slightly elliptical cross-section, and change the outer wall 452 of the cam ring 404 from the elliptical cross-section illustrated in FIGS. 33 and 37 to a slightly less elliptical cross-section, that is, one in which there is less difference between the dimension of the major axis and minor axis. In this range of near-neutral high transmission ratios, what can be called a "start-up" range, the torque applied to the output shaft 434 is high, and the output speed is low, because the displacement in the pump is low, and at full input speed of the input shaft, the pressure can be very high, limited only by the leakage flow and any pressure limiting devices added to prevent over-pressure damage to the apparatus.

In the "start-up" range, the pump working volume 484, defined by the inner surface of the 406 of cam ring when the cam ring 404 is slightly deformed to position the inner wall 450 to its nearly-circular or slightly elliptical cross-section, is slightly reshaped from the perfectly cylindrical form to produce a double lobed shape slightly thicker at the ends on the major axis than at the ends on the minor axis. The working volume thus has two diametrically opposed tapering sectors 490 and, in quadrature thereto, two diametrically opposed flaring sectors 492.

As the pump vanes 410 rotate through the tapering sectors 490, the decreasing radius of the inner cam ring surface 406 causes the pump vanes 410 to be pushed down into the slots 446 in the pump rotor 412, and pressurizes the fluid in the tapering sector 490 since the volume between adjacent vanes 410 decreases as radial distance between the pump rotor 412 and the inner cam ring surface 406 decreases. The fluid pressurized in the tapering sectors 490 acts against the radial faces of the webs 454 in the cam ring 404 and produces a circumferential fluid force thereon that is equal to the product of the fluid pressure and the effective radial web area, which is the difference of the area of the webs 454 and 456. The torque generated by the fluid pressure $P_s$ in the tapering sectors 490 on the cam ring 404 from the inside is equal to the moment arm from the axis of the output shaft to the center of pressure on the net web area, multiplied by the total fluid force exerted by the fluid pressure $P_s$ against the effective area.

The fluid pressurized in the pump tapering sectors 490 is partially displaced by the vanes 410 through passages 494 between the wear plates 443/445 and axially narrowed sections 496 in the inner and outer walls 450 and 452 of the cam ring 404 on both axial sides thereof, centered on the center of the sectors between the webs 454 and 456, as shown in FIG. 44. Fluid that is pressurized in the pump tapering (pressure) sectors 490 can flow through these passages 494 into the pressurized compartments 476P within the cam ring 404, that is, between the inner and outer walls 450 and 452 and between adjacent webs 454 and 456, and from there into expanding sectors 498 of the working volume 486 of the stator unit 402. The shallow radial channel 480 in the torque arms 478 is circumferentially aligned with the widest part of the passages 494 and provides a channel for the fluid through the compartments 476 of the cam ring from the tapering sectors 490 of the pump working volume 484 to the expanding suction sectors 498 of the stator working volume 486.

The outer wall 452 of the cam ring 404, in the near-neutral range of cam ring 404 cross-sections that produce high transmission ratios, is near its most extreme elliptical cross-section, that is, wherein the difference between the major axis and the minor axis is at its greatest. In the expanding suction sectors 498 of the stator working volume 486 on the outside of the cam ring 404 opposite the tapering sectors 490 of the pump working volume 484, the fluid is drawn in through the compartments 476 and the channels 480 of the torque arms 478 by the rotation of the cam ring 404 as the volume between the stator vanes 414 expands. However, very little fluid actually flows since the displacement of the pump working volume is so small and therefore the rotational speed of the cam ring is very slow. Thus, even though the displacement per revolution of the stator in this position is near its maximun, the rotation speed is so slow that the actual flow rate is small.

Fluid pressurizing by the pump vanes 410 in the pump working volume pressure sectors 490 ends at the end of the pressure sectors 490 at the top and bottom webs 454. Beyond the webs 454, the pump working volume 484 begins flaring into the flaring or suction sectors 492. Rotation of the pump vanes 410 into the suction sectors 492 draws fluid through the narrow sections 496 of the cam ring 404 into the expanding volumes between adjacent pump vanes 410. The fluid for the suction sectors 492 is provided from the contracting pressure sectors 499 of the stator working volume 486 that are radially contiguous with the cam ring outer surface 408 outside the pump suction sectors 492. The pressure balancing of the cam ring 404 in the concentric unit shown in FIGS. 17–52 is by fluid communication through the narrow sections 496 of the cam ring 404 at four positions circumferentially spaced around its circumference, as shown in FIGS. AA and 34–36. These narrow sections ensure that the fluid pressure is the same on both sides of the cam ring and in the center sections at any given angular position around the cam ring.

Although most of the fluid flow in the transmission shown in FIG. 17 shuttles through the cam ring 404 directly between the pump working volume 484 and the stator working volume 486, there will be some small leakage volume from high pressure volumes out to the unpressurized sump volume inside the housing 418. For this purpose, four pairs of check valves 500 are provided for admitting make-up fluid into the compartments 476. The check valves 500 are all identical and a description of one will describe them all. As shown in FIGS. 44–52, the check valves 500 each include a seat bushing 502 having an external threaded surface 503 for threaded engagement into tapped holes 516 in the end plates 442 and 444, and a disc 504 held in a socket 506 machined in the wear plates 443 and 445 axially aligned with the seat bushing 502. A finger spring 508 lightly biases the disc 504 against the seat 510 at the inner end of the bushing 502.

The check valve seat bushings 502 each have a flange 512 at the outer end having an outside diameter closely matching the diameter of an outside shoulder 514 of a stepped, internally threaded hole 516 in the end plates 442 and 444. The bushings 512 are internally threaded at 517 for about half their axial length to receive a threaded shoulder bolt (not shown) by which the seat bushings are screwed into the threaded holes 516 in the end plates 442 and 444.

The sockets 506 in the wear plates 443 and 445, shown most clearly in FIG. 51 each are machined about ⅔ deep into the wear plate, opening in the inner facing surface and leaving three radial stub ribs 518 space equally around the periphery of the socket 506 and extending inwardly toward its center. Three holes 520 are drilled in the floor 522 of the socket 506 between each stub rib 518 for fluid flow through the bushing 502 and into the the compartments 476 when make-up fluid is drawn into the suction sectors 492 and 499 of the pump and stator working volumes 484 and 486.

The disc 504 is positioned in the socket 506 and is retained in a centered position therein by the stub ribs 518. The finger spring 508 holds the disc 504 lightly against the seat end 510 of the bushing 502 to ensure against leakage of pressurized fluid out of the cam ring compartments 476. When fluid is needed to make up for leakage out of the pressure sectors 490, the pressure in the flaring sectors 492 drops below the sump pressure inside the housing 418. An impeller 524 mounted on the input shaft 422 creates a region of slightly higher fluid pressure inside an annular shroud 526 to ensure a flow of fluid into the check valve when the pressure in the cam ring compartments 476 drops. Fluid is drawn through the bushing 502, lifting the disc 504 off the seat 510 and flowing around the outside of the disc and through the holes 520 in the floor 522 of the socket, into the cam ring compartment 476.

Fluid flow through the cam ring compartments 476 between the pump working volume 484 and the stator working volume 486 increases as the adjustment of the cam ring 404 approaches an intermediate position wherein the difference between the major axis and minor axis of the ellipse described by the inner cam surface 406 equals the difference between the major axis and minor axis of the ellipse described by the outer cam surface 408. However, even in that position, the flow rate is less than it would be for a conventional hydrostatic transmission because the rotational speed of the cam ring 404 is subtracted from the rotational speed of the pump rotor 412 to obtain the relative rotational speed which in this invention determines the rate of fluid flow between the pump and stator. Naturally, low rates of fluid flow militate for low fluid flow losses and low hydraulic noise, both of which are desirable attributes in a hydraulic transmission as well as most hydraulic machines.

Continued adjustment of the control rods 466 to the left in FIG. 17 beyond the intermediate position, to flex the cam ring 404 toward the position shown in FIGS. 18 and 38, results in a decrease in fluid flow because the stator working volume 486 in the expanding sectors 498 opposite the tapering sectors 490 of the pump working volume 484 are decreasing in displacement, so the fluid pressurized in the pump pressure sectors 490 has less volume into which to flow in the stator sectors 498. The only "volume" available into which the fluid displace by the pump can flow is into the "volume" provided by the retreating surface of the cam ring tapering sector 490 as it rotates in the same direction as the pump rotor. Eventually, in the 1:1 position shown in FIG. 18, rotation of the pump rotor produces an equal rotation of the cam ring (hence 1:1) since there is nowhere for the fluid "displaced" by the pump vanes in the working volume 484 to go, discounting leakage. Therefore, the fluid merely revolves around with the pump rotor, driving the cam ring 404 as if the fluid were a solid. The outer cam ring surface 408 is exactly coaxial with the stator hub and equally spaced therefrom around the entire circumference. The stator vanes seal the fluid in the stator working volume between adjacent vanes so there can be no flow of fluid around the stator hub. No pumping of fluid into or out of the stator working volume occurs in this 1:1 position, discounting leakage, and the fluid in the stator working volume thus also acts as a solid.

Adjustment of the control rod position is by a motor driven adjustment mechanism 530, shown in FIG. 17. A stepper motor 532 is mounted on output end wall 440 and an upright wing 534 projecting in the plane of the end wall 440. The stepper motor 532 has a motor shaft 536 having an inner end received and supported in an axial hole 538 drilled through an annular flange 540 around the inside of the housing 418. A pinion gear 542 is keyed to the motor shaft 536 for rotating a ring gear 544 when the stepper motor is operated. The pinion gear 542 has an elongated toothed section to allow the ring gear to move axially relative to the pinion gear 542 while remaining in driving engagement with the teeth thereof.

A pusher ring 546 is connected into the center of the ring gear by screws 548. The pusher ring 546 has an axial opening 547 that is threaded and threadedly engaged with external matching threads 549 on the outside cylindrical surface of the nipple 438 projecting inwardly from the end wall 440. Rotation of the pinion gear 542 by the stepper motor 532 rotates the ring gear 544 and the attached pusher ring 546 which rotates on the threads 549 on the nipple 538 to axially advance or retract (depending on the direction of motor rotation) the pusher ring 546 toward or away from the end plate 442.

The control rods 466 are each fastened by cap screws at their output ends to a control plate 550. A flanged barrel 552 on the control plate 550, projecting toward the end wall 440, receives a compression spring 554 for biasing the control plate 550 and the attached control rods 466 toward the end wall 440. An inside race of a bearing 556 is mounted on the outside surface of the barrel 552, and the outside race of the bearing 556 contacts the inner end of the pusher ring 546.

Adjustment of the control rods 466 toward the 1:1 position is achieved by rotating of the pinion 542 on the stepper motor shaft 536 to rotate the pusher ring 546 on the threaded nipple 438 and advance the pusher ring 546 toward the end plate 442. The non-rotating outer race of the bearing 556 is pushed by the pusher ring 546 which transmits the push through the rolling elements of the bearing 556 to the rotating inner race. The inner race engages a small shoulder at the junction of the barrel 552 to the flat disc of the control plate 550 to push the control plate 550 and the attached control rods 466 toward the output end of the transmission.

Adjustment of the control rods 466 toward the neutral position is achieved by rotating the pinion 542 the opposite direction to screw the pusher ring 546 on the threaded nipple 438 back toward the the end wall 440. The compression spring 554 bearing against the flange on the barrel 552 pushes the control plate 550 toward the end wall 440 following the retreating inner end face of the pusher ring 546. The control plate pulls the control rods 466 toward the end wall 440 as far as the position of the pusher ring will permit.

Fluid fittings 560 and 562 are mounted on the radial flange 417 of the stator hub 416 communicating through radial holes 564 and 566 with the expanding and contracting sectors, respectively, of the stator working volume 486 opposite the widest passages into the compartments 476 within the cam ring 404. Two similar fluid fittings (not shown) are also provided for establishing fluid communication with the diametrically opposite sectors of the stator working volume and the radially adjacent compartments 476. The fluid fittings 560 and 562 provide a convenient tap for filling or draining the housing with hydraulic fluid, and also provide fluid communication with an fluid circuit, shown in FIG. 53. The fluid circuit provides the capability of using the transmission for regenerative braking, engine starting, auxiliary power for accelaration of the vehicle or other powered application, and for fluid power for auxiliary power applications such as hydraulic motors or actuators.

Figure 53:
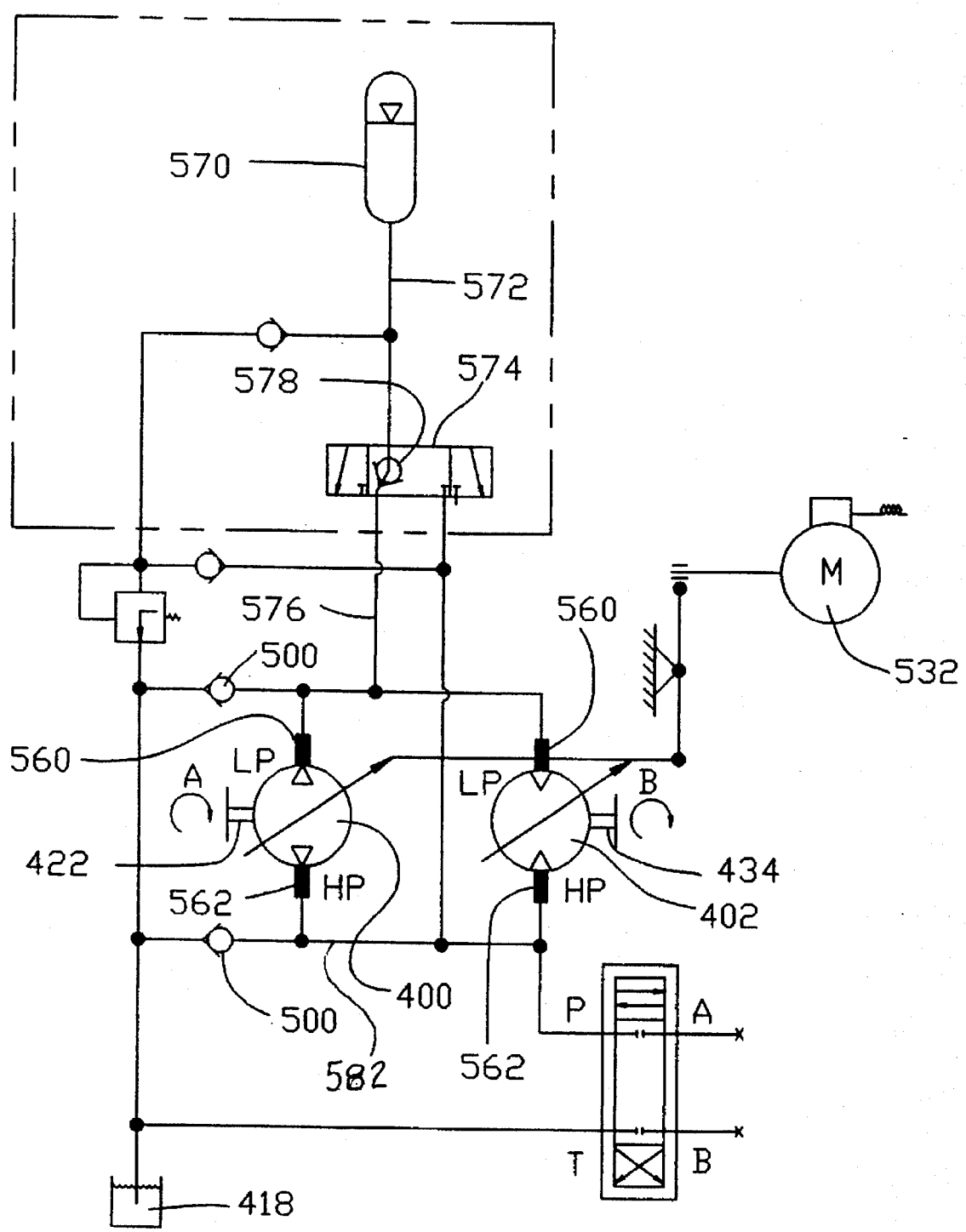
FIGS. 53–56 are schematic diagrams of a hydraulic circuit used in all three embodiments to obtain regenerative braking, regenerative acceleration, engine starting, and auxiliary hydraulic power for take-off applications.

In the circuit diagram of FIG. 53, the check valves 500 are shown external to the pump and stator units 400 and 402, and the sump is shown as a remote container, but those are merely conventional notations for simplicily in drawing the circuit diagram. The lines shown in FIG. 53 from the check valves to the pump and stator are actually just the holes 520 through the floor 522 of the socket in the wear plates 443 and 445.

The fluid circuit includes a hydraulic accumulator 570 connected via a fluid line 572 to a spool valve 574 which can be adjusted to any of three positions. The position illustrated in FIG. 53 is the mode for normal operation, wherein power is input to the pump unit 400 from the input shaft 422 and produces output torque in the output shaft 434. The flaring (suction) sectors of the pump and the radially aligned contracting sectors 499 of the stator unit 402 are connected by a line 576 to the accumulator 570 via a check valve 578 which may be integral with the valve 570. During travel of a vehicle down hill or during deceleration, the output shaft 434 back drives the cam ring 404 to overdrive the pump rotor 412. The pressure and suction roles of the working volume sectors are now reversed, and the flaring sectors 492 now act as pressurizing sectors which can pump fluid through the fitting 562 and the line 576, through the check valve 578 and into the accumulator. This stored enegry is then available for later use in accelerating the vehicle or engine starting, as described below.

Figure 54:
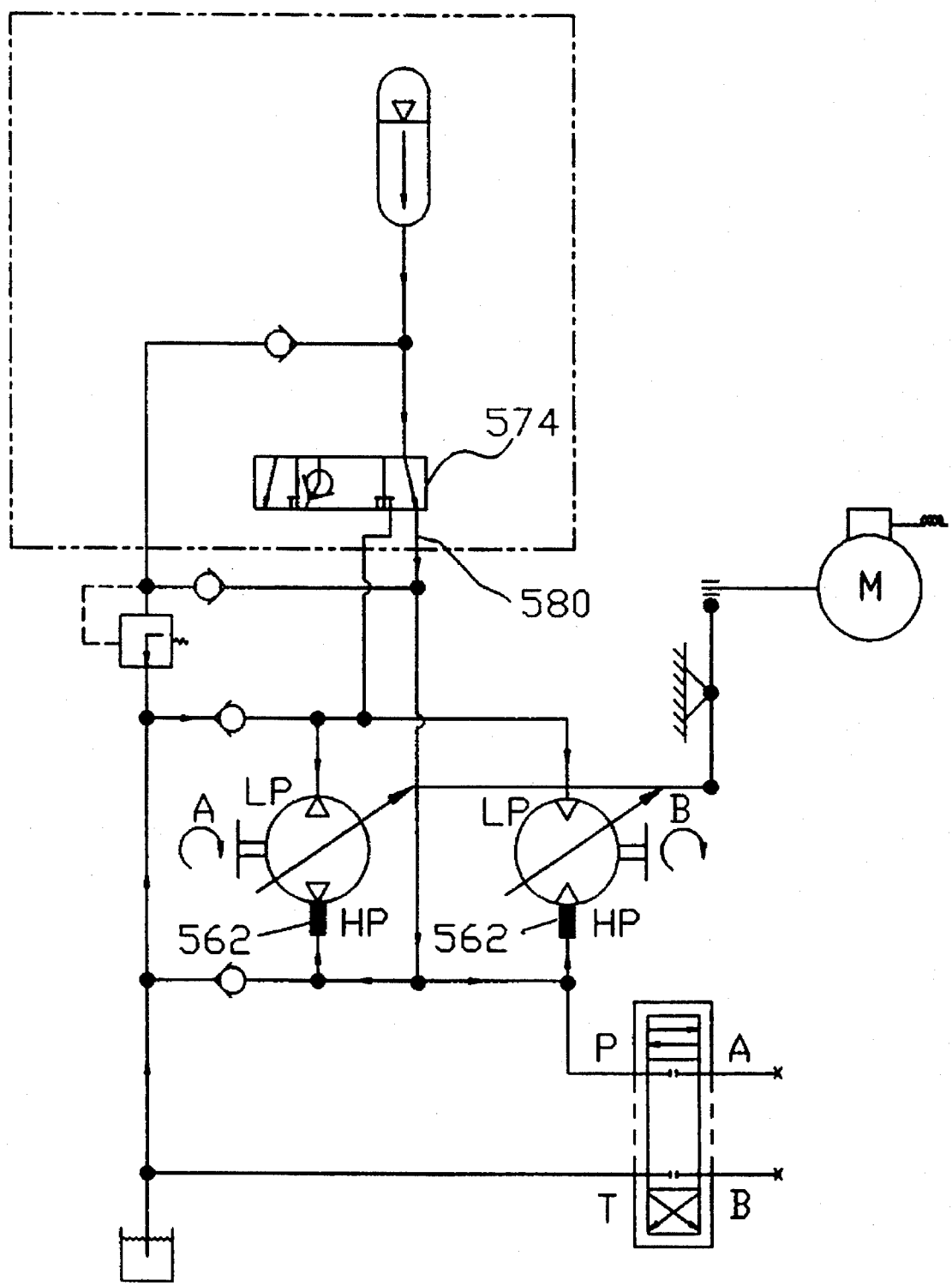

Use of the energy stored in the accumulator 570 may be in accelerating the vehicle, as illustrated in FIG. 54. This application of the invention would be of particular value in vehicles that make frequent stops, such as city busses, postal delivery trucks, garbage trucks, etc. The ability to recover a portion of the braking energy now wasted in the operation of those vehicles and use that energy to reaccelerate the vehicle would enable the vehicle to be built with a smaller engine, since the engin power is chosen for the maximum power requirements needed for acceleration, and would greatly improve the efficiency of their opeation, as well as avoiding the generation of large quantities of air polluting engine emissions.

The use of the energy stored in the accumulator for acceleration, illustrated in FIG. 54, shows the spool valve 574 connecting the line 572 from the accumulator 570 to a fluid line 580 which is connected to the high pressure taps 562. This pressurized fluid is additive to the fluid power produced by the pump unit 400 and increases the power output to the output shaft in terms of increased torque, increased speed, or both.

Figure 55:
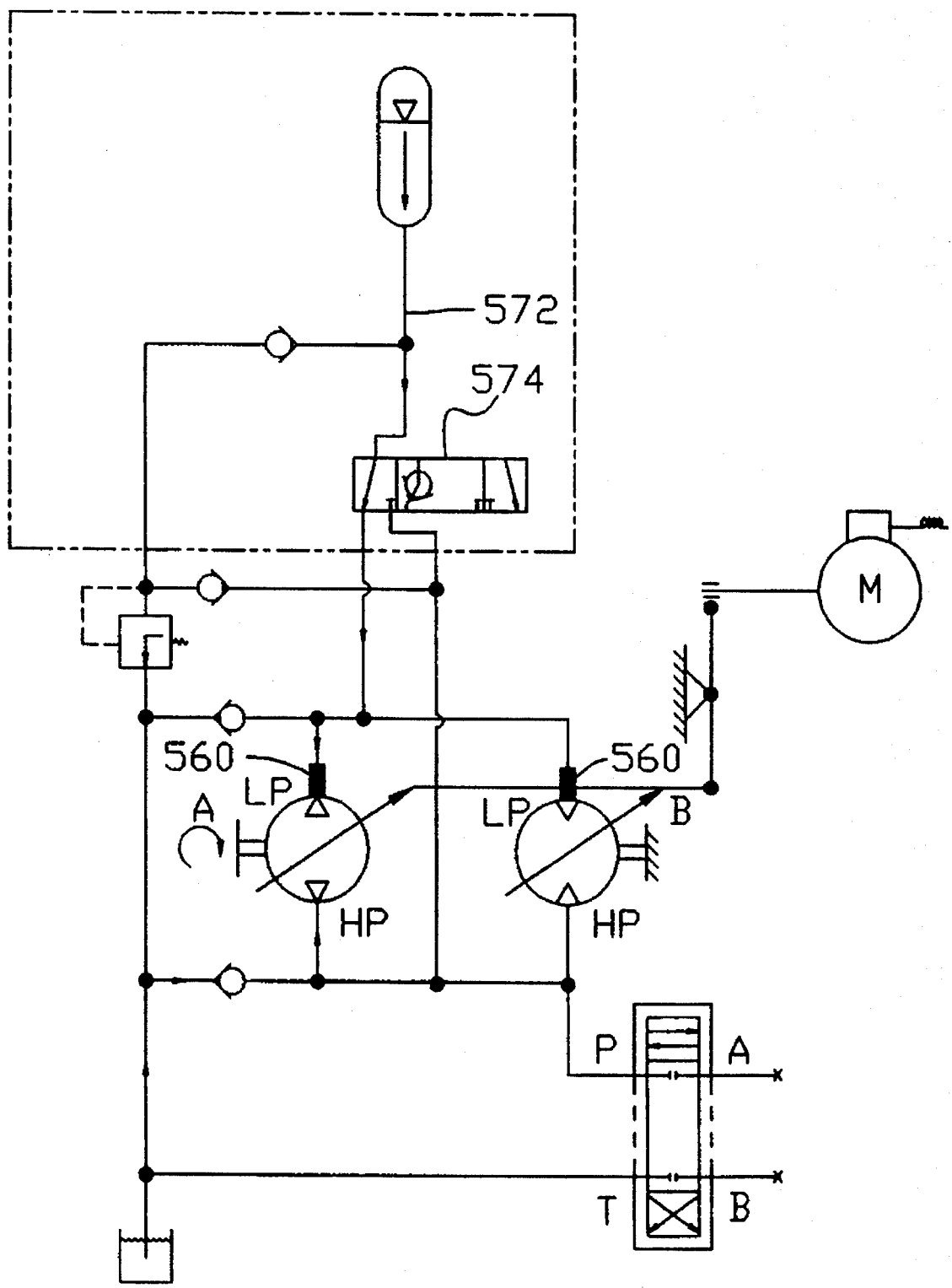

The energy stored in the accumulator 570 may be used for engine starting, thereby making unnecessary the starter motor used almost universally on vehicle engines. The weight and cost saved by eliminating the starter motor and reducing the size of the vehicle battery to accomodate just the other electrical needs of the vehicle makes the use of the inventive transmission attractive. The use of the accumulator 570 for engine starting, illustrated in FIG. 55, uses the third position of the spool valve 574 wherein the accelerator is connected via the line 572 through the spool valve 574 in its third position to the line 576 and thence to the low pressure taps 562. The brake is applied to prevent the transmission from driving the wheels forward, and the fluid pressure operates against the vanes on the pump rotor 412 to drive the input shaft in the normal direction of engine output shaft operation. The speed of rotation can be set by the position of the control rods 466. When the engine starts, the transmission will not be in neutral, so to prevent the transmission from applying sudden power to the wheels, a suitable vent valve (not shown) is provided in the stator hub 416 for venting fluid pressure in the working volumes to the sump until the control rods 466 can be reset to the neutral position.

Figure 56:
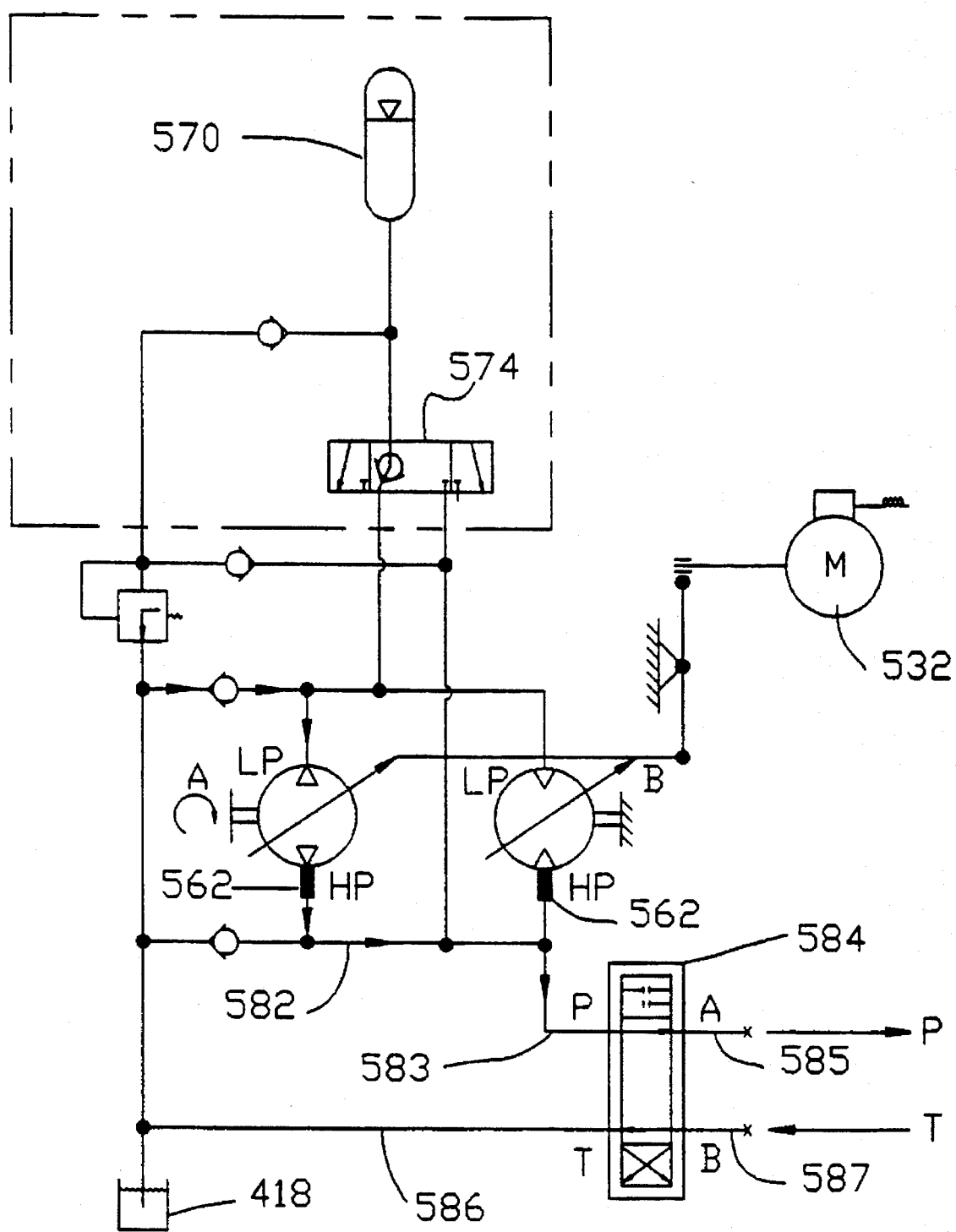

The hydraulic circuit shown in FIG. 56 can be configured for power take-off by positioning the valve 574 to the same position it occupies during normal operation, as shown in FIG. 53, and locking the wheels, for example, by applying the emergency brake, as indicated by the grounded symbol at the stator output. The transmission is shifted from neutral to a low or intermediate ratio using the motor 532, causing the pump to begin generating an output flow and pressurizing the high pressure HP ports of the pump and stator and a high pressure line 582 connected to the fitting 562. A pressure input line 583 is connected between the high pressure line 582 and a power take-off valve 584 which, in the power take-off configuration, is positioned to pass the fluid flow through to an output pressure line 585 on the output side of the power take-off valve 584 where it is available for use by a fluid driven application such as a hydraulic motor for a garbage truck trash compactor. A sump or tank line 586 to the sump 418 is connected to the power take-off valve 584 for fluid coupling through the valve to a sump line 587 on the output side of the valve, for conveying low pressure fluid back to the sump 418.

Figure 6:
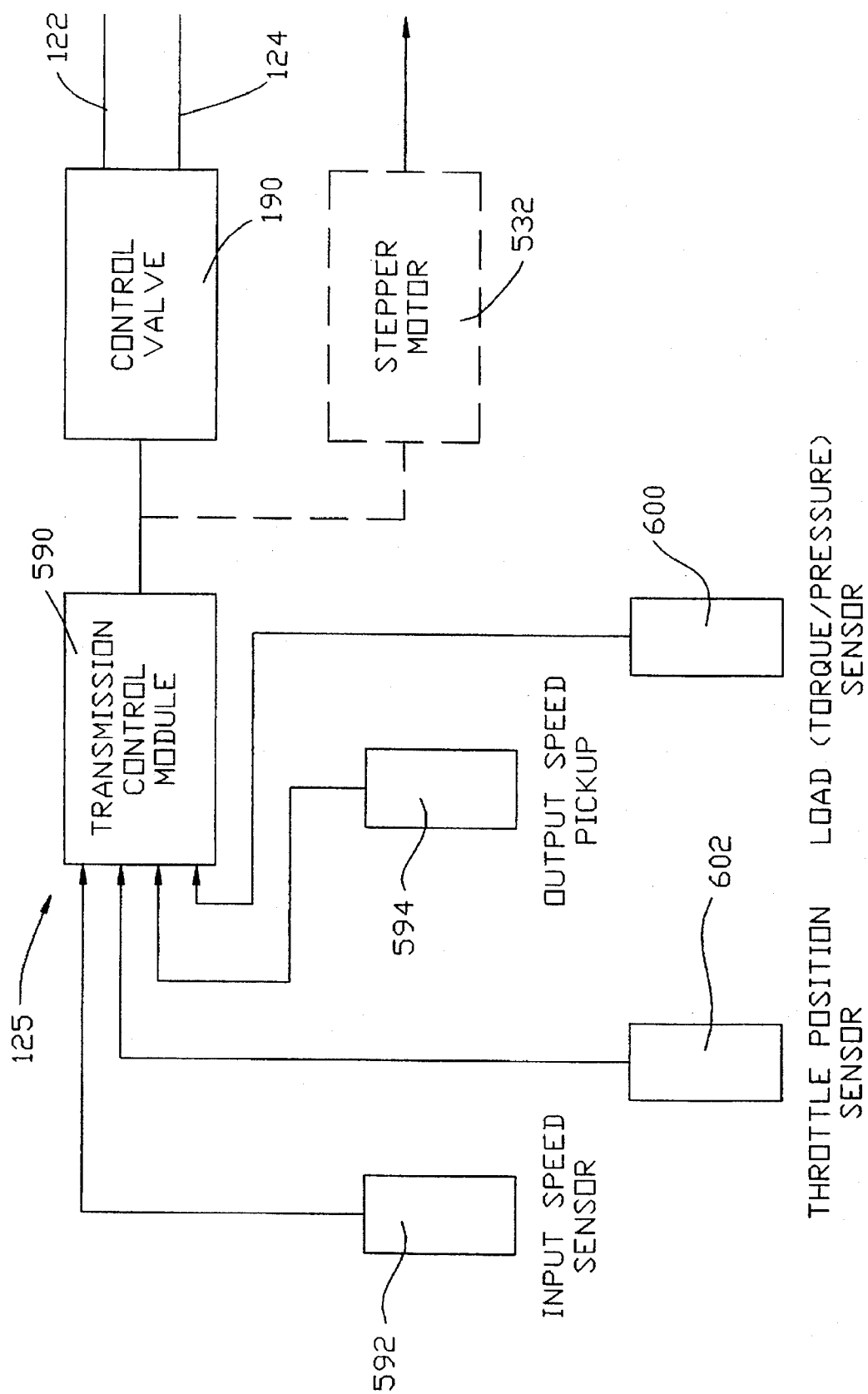
FIG. 6 is a schematic view of the control system for controlling the transmission ratio of the transmission shown in FIG. 1.

A speed control system, illustrated in FIG. 6, for an application, such as a motor vehicle, a machine tool, or a marine vessel, in which the transmission is used includes a programmable controller 590 with input connections for receiving signals from an input speed sensor 592 that senses the input speed of the input shaft or the engine output shaft, and an output speed sensor, such as a proximity sensor 594 mounted in a port 596 in the housing 418 in proximity to teeth 598 on the beveled outside edge of the end plate 442. A load sensor input connection may also be provided for input of load information from a load sensor 600 on the output shaft. The controller 590 accepts throttle position information from a throttle position sensor 602 reflecting the desires of the operator and adjusts the output of the transmission by controlling the position of the control rods with the motors 320 or 532 in the case of the second and third embodiments, or a control valve for controlling the position of the annular piston in the case of the first embodiment. The controller 590 may also be provided with an output signal to adjust the engine to accomodate demands outside of its normal operating range.

Thus, the invention offers improved system efficiencies in applications powered by a prime mover that previously necessitated sizing the prime mover to meet the instantaneous power demands of only a small percentage of the overall operating time of the apparatus. The prime mover, typically an internal combustion engine, operates most efficiently and cleanly within a narrow range of operating speeds. The infinitely variable transmission of this invention makes it possible to operate the prime mover in the range of its optimum operating point for a large percentage of its operating time by utilizing the continuously variable gear ratio over an infinite range between neutral and 1:1, with even some overdrive and reverse ratios possible. This transmission makes possible the elimination of the typical cycling up through a gear train while accelerating a vehicle, with each shift of gears accompanied by a drop in engine speed to near idle, and then a rapid increase of engine speed back to the normal operating point, which militates for low fuel efficiency and dirty exhaust emissions during the non-optimum periods of engine speed.. The high efficiency of this transmission and its low manufacturing and maintenance costs, along with its compact size and low weight, make this transmission an efficient and cost effective means of controlling the operation of an apparatus powered by a prime mover. The opportunities for recovery of braking energy, powering hydraulic take-off apparatus, charging of hydraulic accumulators and starting of the prime mover by back driving through the transmission using the hydraulic accumulator provide many new product possibilities using efficient down-sized prime movers in applications where energy can be stored for surge demands such as acceleration and hydraulic power needs.

Obviously, numerous modifications and variations of the preferred embodiments will occur to those skilled in the art in view of this disclosure. Accordingly, it is expressly to be understood that practice of these modifications and variations, and the equivalents thereof, will be regarded as within the spirit and scope of the invention as defined by the following claims, wherein we claim:

What is claimed is:

1. A method of converting mechanical energy in the form of torque in a rotating input shaft to fluid pressure at a variable delivery flow rate and pressure, comprising:

rotating a pump rotor with said input shaft, said pump rotor having a plurality of radially extending vanes inside a flexible cam ring;

contacting an inside surface of said flexible cam ring with outside edges of said vanes and sweeping a swept volume within said flexible cam ring with said vanes;

sealing said swept volume on opposite axial sides thereof with a port plate on one side and a side seal plate on the side opposite said port plate, and engaging opposite sides of said flexible cam ring and said vanes with said plates;

drawing fluid into said swept volume within said cam ring through a first set of ports in said port plate by rotating said vanes into a suction region within said cam ring, said suction region having an increasing radius in the direction of said vane rotation, and then pressurizing said fluid for exhausting through a second set of ports in said port plate, circumferentially offset from said first set of ports, by rotating said vanes into a pressurizing region within said cam ring having a decreasing radius in the direction of said vane rotation; and changing said cam ring cross-sectional shape from a round elliptical shape to a flatter elliptical shape by radially flexing said cam ring to vary said delivery flow rate and pressure.

2. A method as defined in claim 1, wherein:

said flexing of said cam ring includes exerting an inward radial force on said cam ring.

3. A method as defined in claim 2, wherein said inward radial force exertion includes:

moving at least one axial control rod positioned radially outside said cam ring in an axial direction; and converting said axial motion of said control rod into a radial force exerted on said cam ring of sufficient magnitude to flex said cam ring.

4. A method as defined in claim 2, wherein said inward radial force exertion includes:

moving at least two axial control rods positioned diametrically opposite each other radially outside said cam ring in an axial direction; and converting said axial motion of said control rods into opposed radial forces exerted on said cam ring of sufficient magnitude to flex said cam ring.

5. A method as defined in claim 1, further comprising:

radially balancing fluid forces on inner and outer radial surfaces of said cam ring to prevent distortion of said cam ring cross-sectional shape by fluid pressure.

6. A method as defined in claim 5, wherein said radial balancing of said fluid forces includes venting fluid radially through said cam ring into a space outside of said cam ring and within a rigid back-up sleeve.

7. A method as defined in claim 6, further comprising:

pressurizing said fluid in said pressurizing region by rotating said vanes into a decreasing volume of said pressurizing region within said cam ring between said intake port and an abuttment on said cam ring sealed to said backup sleeve.

* * * * *